United States Patent
Yang et al.

(10) Patent No.: US 12,007,304 B2
(45) Date of Patent: Jun. 11, 2024

(54) DEVICES AND METHODS FOR PIPELINE LEAKAGE DETECTION

(71) Applicant: CHANGZHOU UNIVERSITY, Jiangsu (CN)

(72) Inventors: Ke Yang, Changzhou (CN); Guangyu Liu, Changzhou (CN); Zhixiang Xing, Changzhou (CN); Hong Ji, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 18/331,131

(22) Filed: Jun. 7, 2023

(65) Prior Publication Data

US 2024/0085261 A1   Mar. 14, 2024

Related U.S. Application Data

(63) Continuation of application No. PCT/CN2023/094947, filed on May 18, 2023.

(30) Foreign Application Priority Data

Sep. 7, 2022   (CN) .......................... 202211088502.5

(51) Int. Cl.
    *G01M 3/04*    (2006.01)
(52) U.S. Cl.
    CPC ..................... *G01M 3/04* (2013.01)
(58) Field of Classification Search
    CPC ............... G01M 3/04; F17D 5/06; F17D 5/02
    See application file for complete search history.

(56) References Cited

U.S. PATENT DOCUMENTS

| | | | |
|---|---|---|---|
| 9,989,436 B1 * | 6/2018 | Kofoed | ................. G01M 3/005 |
| 2013/0154666 A1 | 6/2013 | Albaladejo et al. | |

(Continued)

FOREIGN PATENT DOCUMENTS

| | | |
|---|---|---|
| CN | 107218516 A | 9/2017 |
| CN | 110925602 A | 3/2020 |

(Continued)

OTHER PUBLICATIONS

International Search Report in PCT/CN2023/094947 mailed on Jul. 24, 2023, 11 pages.

(Continued)

*Primary Examiner* — David Z Huang
(74) *Attorney, Agent, or Firm* — METIS IP LLC

(57) ABSTRACT

The present disclosure relates to a device and a method for pipeline leakage detection. The device for pipeline leakage detection includes a metal powder storage box, a plurality of ribs, and a signal collection and processing device. The metal powder storage box is ring-shaped and made of insulating material, which is configured to be sleeved on a pipeline. Metal powder is stored inside of the metal powder storage box, and inner and outer peripheral walls of the metal powder storage box are of mesh structure, which allows the metal powder to be ejected from the metal powder storage box under the push of leakage fluid of the pipeline. The plurality of ribs are made of insulating material, which are distributed evenly along an outer peripheral wall of the metal powder storage box, and fixed on the metal powder storage box respectively, and a plurality of coils arranged in a layer are configured inside the plurality of ribs. The signal collection and processing device is connected to each coil for collecting and monitoring electromagnetic signal of each coil and obtaining leakage parameters based on the abnormal signal when an abnormal signal occurs. The present (Continued)

disclosure can well detect whether the pipeline leaks and obtain the leakage parameters efficiently, portably, and accurately in the case of leakage.

17 Claims, 15 Drawing Sheets

(56) References Cited

U.S. PATENT DOCUMENTS

| | | | |
|---|---|---|---|
| 2016/0273995 A1* | 9/2016 | Dandekar | G01M 3/182 |
| 2018/0202888 A1 | 7/2018 | Tarafder et al. | |
| 2020/0018662 A1 | 1/2020 | Hawwwa et al. | |
| 2021/0041122 A1 | 2/2021 | Fan et al. | |

FOREIGN PATENT DOCUMENTS

| | | |
|---|---|---|
| CN | 113236985 A | 8/2021 |
| CN | 115523429 A | 12/2022 |

OTHER PUBLICATIONS

Written Opinion in PCT/CN2023/094947 mailed on Jul. 24, 2023, 9 pages.

* cited by examiner

DEVICES AND METHODS FOR PIPELINE LEAKAGE DETECTION

CROSS-REFERENCE TO RELATED APPLICATIONS

The application is a continuation application of International Application No. PCT/CN2023/094947, filed on May 18, 2023, which claims priority of Chinese Patent Application No. 202211088502.5, filed on Sep. 7, 2022, the entire contents of each of which is incorporated herein by reference.

TECHNICAL FIELD

The present disclosure relates to the field of pipeline leakage detection, and in particular to a device and a method for pipeline leakage detection.

BACKGROUND

As a major oil and gas consumer, the construction of oil and gas transportation pipelines is also accelerating, and the scale of construction and use of long-distance pipelines is increasing. Pipeline leakage has become an urgent safety problem for oil and gas pipelines. The leakage problem exists in almost all links of using oil and gas energy, including production, transportation, and use.

There have been many serious safety accidents caused by oil and gas pipeline leakage, resulting in heavy casualties and property losses. The oil and gas pipeline leakage leads to environmental pollution, fire, and even an explosion, so it is of great significance to detect pipeline leakage in a timely, efficient, and accurate manner.

Pipeline leakage detection and location refers to the use of various technical principles and tools to detect working conditions of the transportation pipeline. When leakage occurs in transportation pipelines, it can accurately and quickly identify a leakage state of the pipeline and locate a specific location of a leakage point, so that people can quickly respond to leakage accidents, so as to avoid damage and loss.

Current pipeline leakage detection technology can be roughly divided into three categories: a hardware detection method, a manual inspection method, and a software detection method. The mainstream detection method mainly uses infrared, acoustic waves, negative pressure detection, etc. to analyze leakage. Existing detection methods have problems of cumbersome and complicated operations, long signal processing cycles, low efficiency, poor portability, and inaccurate detection.

SUMMARY

A technical problem to be solved by the present disclosure is to overcome defects of the prior art and provide a device for pipeline leakage detection, which can well detect whether the pipeline leaks and obtain leakage parameters efficiently, portably, and accurately in the case of leakage.

One or more embodiments of the present disclosure provide a device for pipeline leakage detection, the device includes: a metal powder storage box, at least one rib, and a signal collection and processing device. The metal powder storage box is sleeved on a detected pipeline, the metal powder storage box has a mesh structure so that the metal powder is ejected from the metal powder storage box under the push of leakage fluid of the detected pipeline; the at least one rib is evenly distributed along an outer peripheral wall of the metal powder storage box and fixed on the metal powder storage box, and at least one coil is arranged in a layer in the at least one rib; the signal collection and processing device is connected to the at least one coil, wherein the signal collection and processing device is configured to collect and monitor an electromagnetic signal of the at least one coil, and obtain leakage parameters based on the abnormal signal when an abnormal signal occurs.

One or more of the embodiments of the present disclosure provides a method for pipeline leakage detection, which is executed by a processor, the method, based on the device for pipeline leakage detection, comprises: collecting the electromagnetic signal of at least one coil in a preset state by the signal collection and processing device; the preset state including that the metal powder storage box corresponding to the at least one coil is in a process of moving; determining a source of the abnormal signal in response to detecting the abnormal signal: determining that the detected pipeline has no leakage in response to the abnormal signal coming from interference; analyzing and processing the abnormal signal to obtain leakage parameters in response to the abnormal signal coming from the leakage of the detected pipeline; and determining that the detected pipeline has no leakage in response to a failure to detect the abnormal signal.

In some embodiments of the present disclosure, using a leakage medium to cause the metal powder in the metal powder storage box to move with the same law as the leakage medium, thereby causing coils to generate the abnormal signal, and then analyzing the abnormal signal caused by the movement of metal particles in a magnetic field to analyze leakage status of the pipeline, making the detection process more efficiently, portably, and accurately.

DETAILED DESCRIPTION

Figure 1:
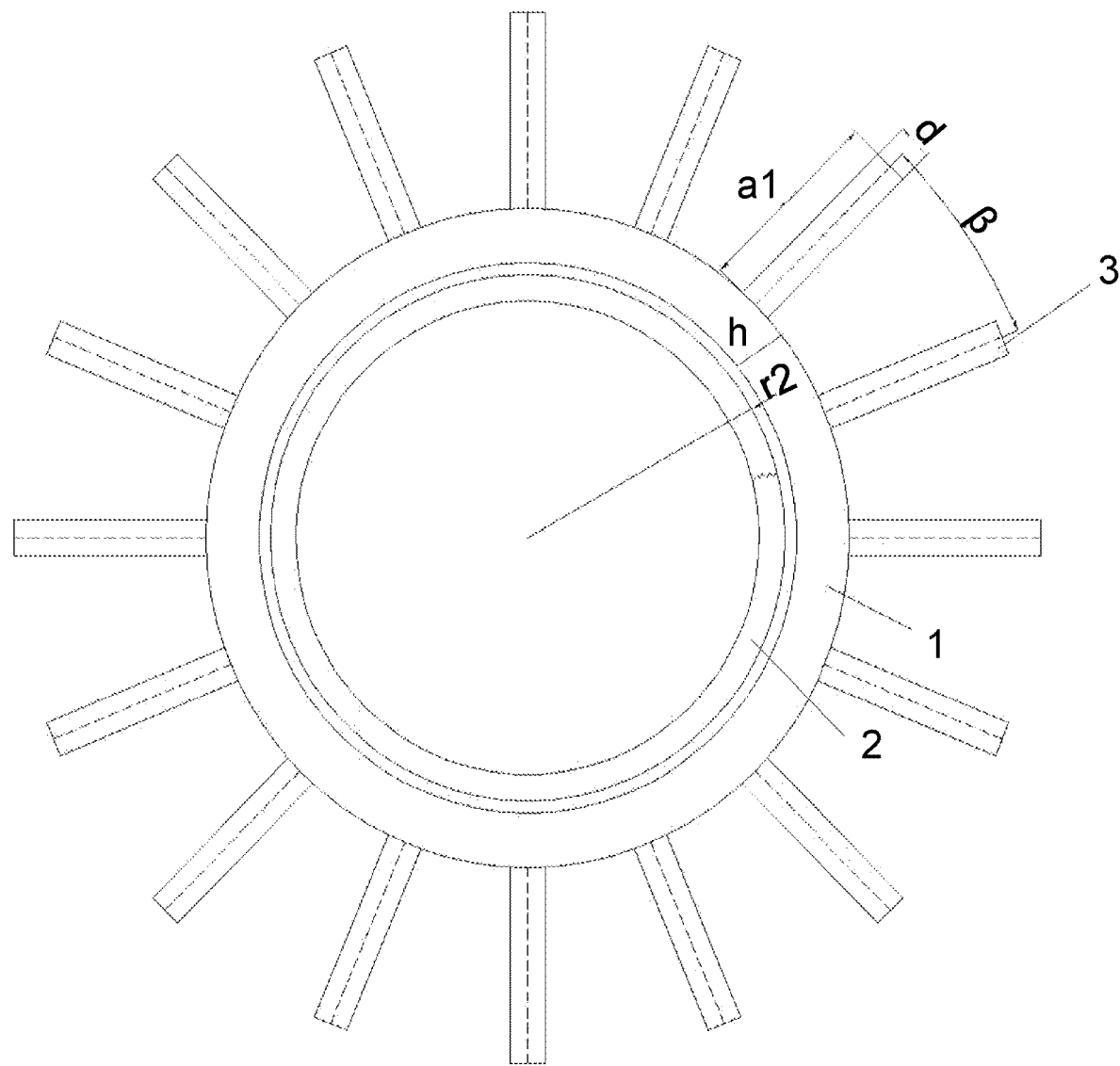
FIG. 1 is a diagram illustrating an exemplary structure of a device for pipeline leakage in some embodiments of the present disclosure.

To make the content of the present disclosure easier to understand clearly, a further description of the present disclosure based on specific embodiments and combined with drawings is provided below.

As shown in FIGS. 1-4, a device for pipeline leakage detection includes a metal powder storage box, at least one rib, and a signal collection and processing device. The metal powder storage box is sleeved on a detected pipeline and has a mesh structure so that metal powder is ejected from the metal powder storage box by the push of leakage fluid of the detected pipeline. The at least one rib is evenly distributed along an outer peripheral wall of the metal powder storage box and fixed on the metal powder storage box, and at least one coil is arranged in a layer in one of the at least one rib. The signal collection and processing device is connected to the at least one coil, which is configured to collect and monitor an electromagnetic signal of the at least one coil, and obtain leakage parameters based on the abnormal signal when an abnormal signal occurs.

The leakage parameters refer to parameters related to leakage on the detected pipeline.

The metal powder refers to magnetic metal powder capable of generating electromagnetic induction with coils, such as any one of iron, cobalt, nickel, or their alloys, etc.

In some embodiments, the processor may establish a preset table based on a corresponding relationship between the abnormal signal and the leakage parameters in historical data, and determine the leakage parameters by looking up the table based on the abnormal signal.

In some embodiments, the metal powder storage box 1 is ring-shaped and made of insulating material. The metal powder is stored inside the metal powder storage box 1, and the inner and outer peripheral walls are of mesh structure, which allows the metal powder to be ejected from the metal powder storage box 1 under the push of leakage fluid of the pipeline 2.

It may be understood that the metal powder storage box 1 is sleeved on the detected pipeline 2, and the electromagnetic signal is monitored and collected during the movement of the metal powder storage box 1. In actual movement, obstruction factors may be encountered. For example, obstruction factors include: pipeline elbows, pipeline supports, pipelines that are not exposed (such as buried pipelines, overhead pipelines), etc. When a long-distance pipeline mentioned in one or more embodiments of the present disclosure is a buried pipeline, the metal powder storage box mentioned in one or more embodiments of the present disclosure may be preset (e.g., pre-installed) on the detected pipeline.

In some embodiments, the metal powder storage box may also be assembled from a plurality of parts. For example, the metal powder storage box may be composed of two semi-circular parts, three 120° fan-shaped parts, or other arbitrary shapes and numbers of parts. In some embodiments, a plurality of parts of the metal powder storage box may be assembled flexibly and conveniently to adapt to different installation scenarios. For example, if there is an unavoidable shield at the laying location of the bottom of the pipeline, making the metal powder storage box unable to be installed, then the metal powder storage box may be installed in the upper part of the pipeline where it is able to be installed.

In some embodiments, the device for pipeline leak detection has a plurality of ribs 3, which are made of insulating material, distributed evenly along an outer peripheral wall of the metal powder storage box 1, and fixed on the metal powder storage box 1 respectively, and a plurality of coils 4 arranged in a layer are configured inside the plurality of ribs 3.

The signal collection and processing device may be connected to each coil 4 for collecting and monitoring electromagnetic signals of each coil 4. The signal collection and processing device may serve as a component of the processor and be integrated into the processor. In some embodiments, the processor (the signal collection and processing device) may obtain the leakage parameters based on the abnormal signal when the abnormal signal occurs.

In some embodiments, the leakage parameters may include at least one of a leakage velocity, a leakage amount per unit time, a leakage hole shape, and a leakage location.

The leakage velocity refers to velocity at which fluid in the pipeline flows out from a leakage hole. The leakage amount per unit time refers to a fluid volume of the fluid in the pipeline that leaks out from the leakage hole per unit time.

In some embodiments, both the metal powder storage box 1 and the ribs may be made of insulating materials, so as to avoid affecting a magnetic field required and detection results.

In some embodiments, the mesh structure may allow the metal powder to be well stored in the metal powder storage box 1 when the metal powder is not pushed by the leakage fluid. After the metal powder in the metal powder storage box 1 is ejected, the metal powder may continue to be added into the metal powder storage box 1.

In some embodiments of the present disclosure, a leakage medium is used to cause the metal powder in the metal powder storage box 1 to move with the same law as the leakage medium, thereby causing the coil 4 to generate the abnormal signal, and then a leakage status of the pipeline 2 is analyzed by analyzing the abnormal signal caused by the movement of metal particles in the magnetic field, which has advantages of high efficiency, portability, and accuracy.

In some embodiments, at least one coil in any rib of at least one rib forms at least one coil plane, and the at least one coil plane is distributed divergently along a radial direction of the metal powder storage box and parallel to an axial direction of the metal powder storage box.

In some embodiments, at least part of coils in ribs form a coil plane, and the coil plane may be parallel to the axial direction of the metal powder storage box or relative to the axial direction of the metal powder storage box at a certain angle so that the moving metal powder may pass through the coils and have electromagnetic induction with the coils.

Figure 2:
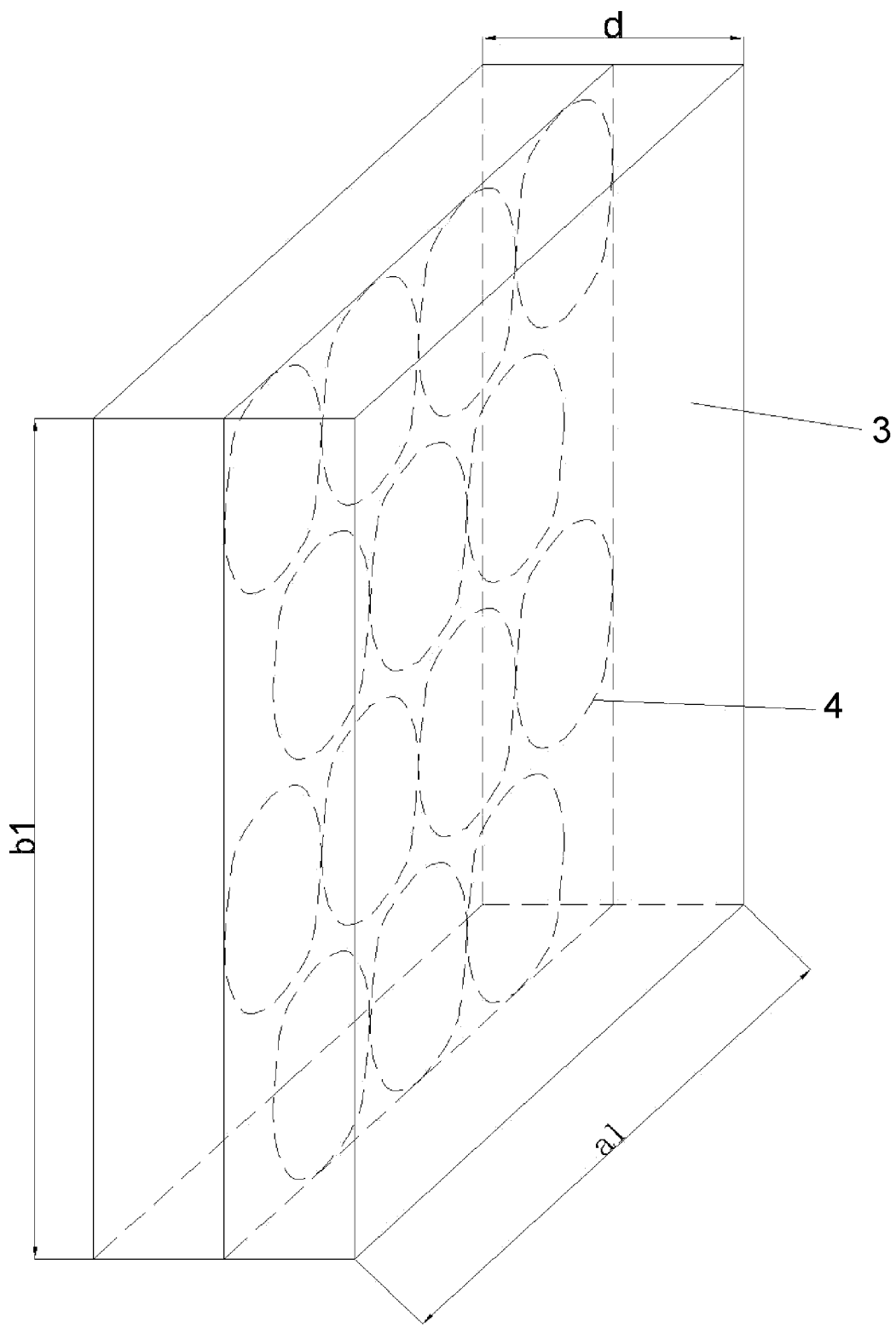
FIG. 2 is a diagram illustrating an exemplary structure of a rib of the device for pipeline leakage in some embodiments of the present disclosure.
Figure 3:
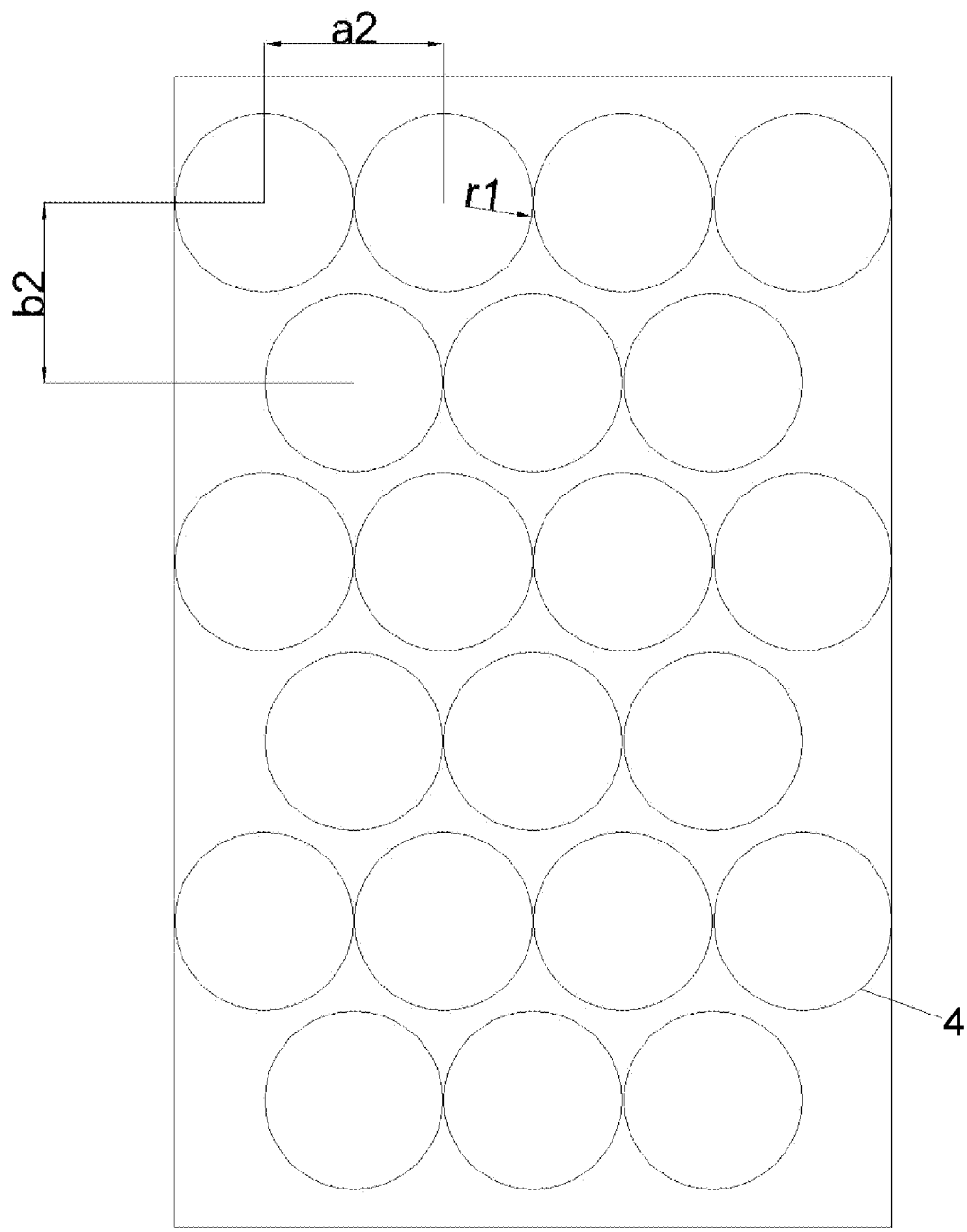
FIG. 3 is a diagram illustrating a coil plane of the device for pipeline leakage in some embodiments of the present disclosure.
Figure 4:
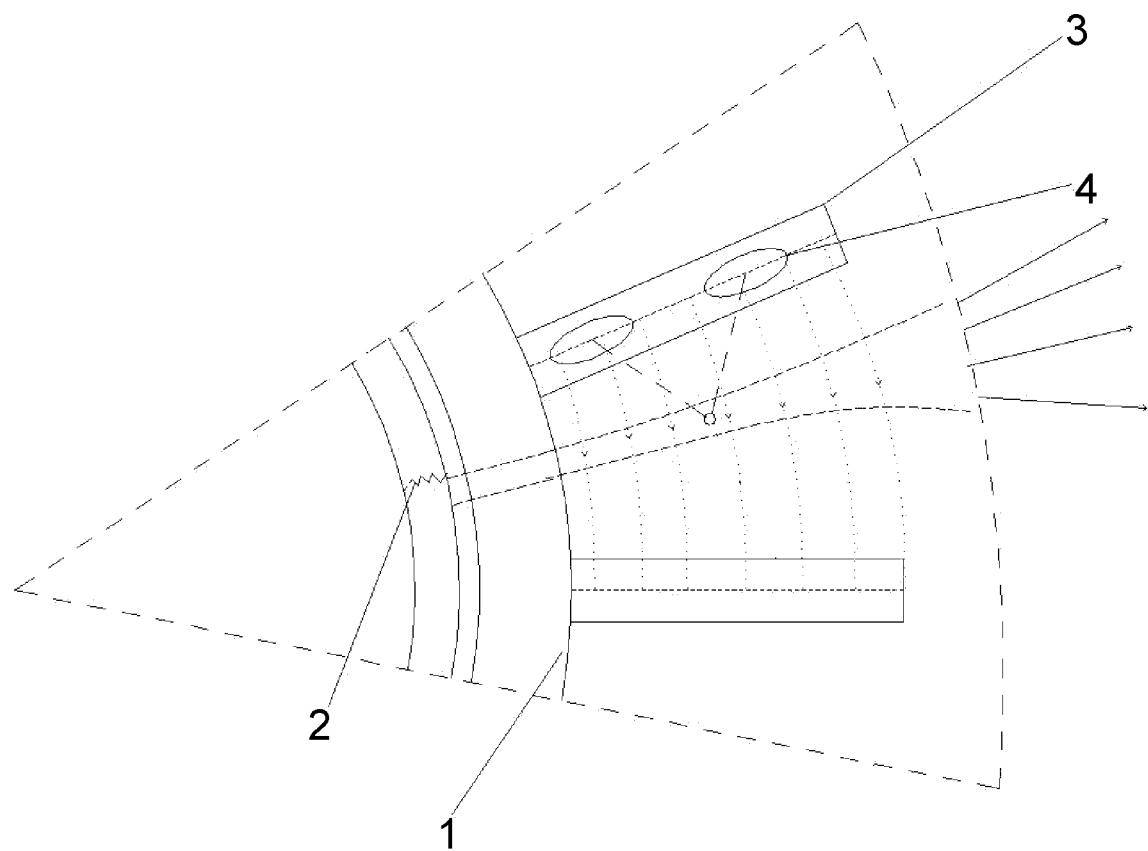
FIG. 4 is a partially enlarged diagram of the device for pipeline leakage during a working process in some embodiments of the present disclosure.

In some embodiments, as shown in FIGS. 2 and 3, the coils 4 in each rib 3 may form a coil plane, and each coil plane is distributed divergently along the radial direction of the metal powder storage box 1 and parallel to the axial direction of the metal powder storage box 1.

In some embodiments, the signal collection and processing device may collect an electromagnetic signal of at least one coil in a preset state; the preset state including that the metal powder storage box corresponding to the at least one coil is in a process of moving; determine a source of an abnormal signal in response to detecting the abnormal signal: determine that the detected pipeline has no leakage in response to the abnormal signal coming from interference; analyze and process the abnormal signal to obtain leakage parameters in response to the abnormal signal coming from leakage of the detected pipeline; and determine that the detected pipeline has no leakage in response to a failure to detect the abnormal signal.

The abnormal signal may refer to an electromagnetic signal with an abnormal fluctuation amplitude in coils.

In some embodiments, the signal collection and processing device may obtain the abnormal signal in a plurality of ways. For example, the signal collection and processing device may compare maximum value points of two adjacent electromagnetic signals, and determine the abnormal signal when the difference between the maximum value points exceeds a fluctuation threshold. As another example, the signal collection and processing device may monitor the magnitude of an electromagnetic signal and a signal threshold, and determine the abnormal signal when the electromagnetic signal is greater than the signal threshold. The fluctuation threshold and signal threshold may be set based on experience or system default.

Figure 5:
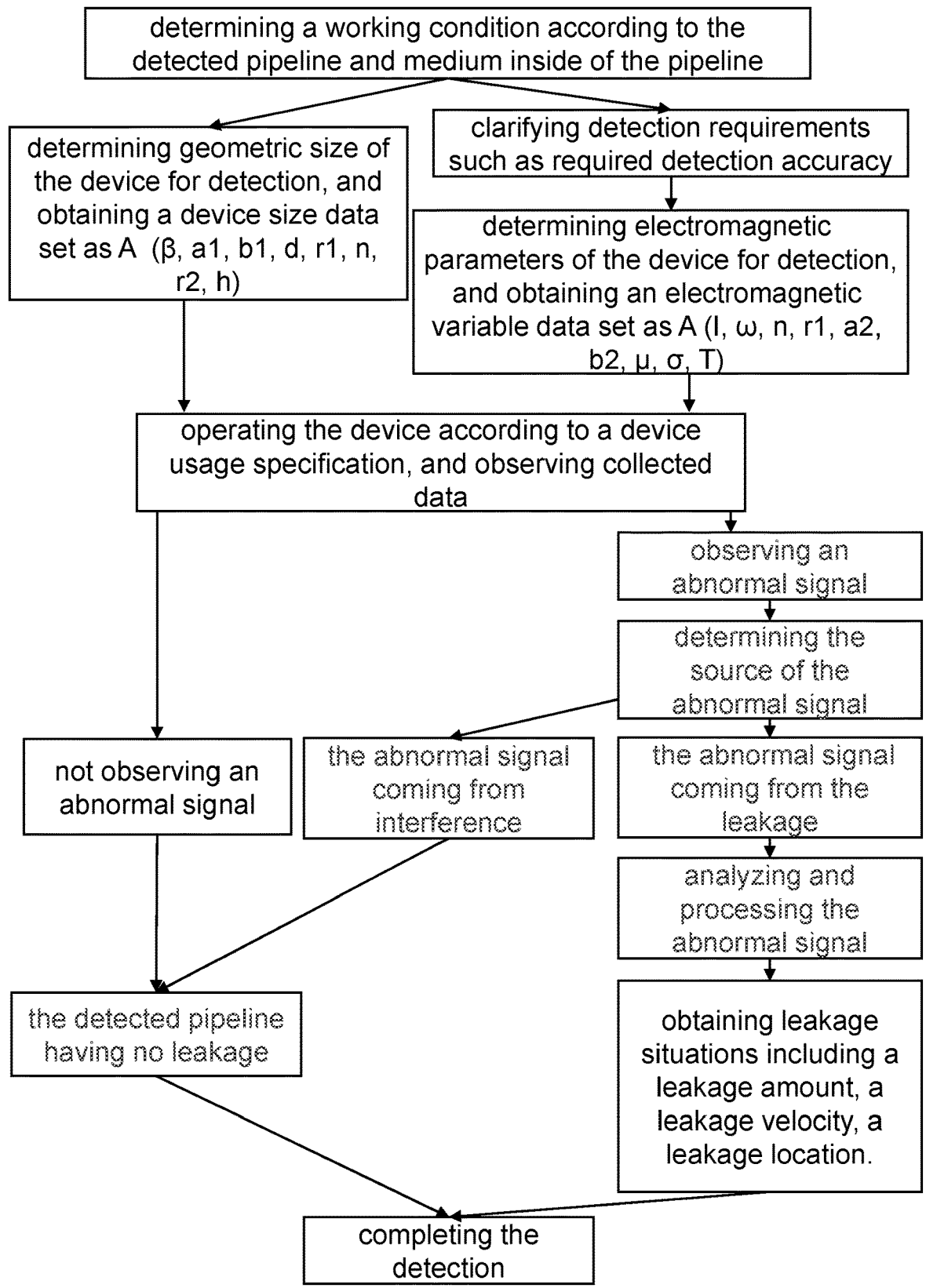
FIG. 5 is a flowchart illustrating an exemplary process of a method for pipeline leakage detection in some embodiments of the present disclosure.

As shown in FIG. 5, a method for pipeline leakage detection is implemented based on the above-mentioned device for pipeline leakage detection, the method includes: sleeving the metal powder storage box 1 on the detected pipeline 2, moving the metal powder storage box 1, and monitoring collected electromagnetic signal during the movement;
if the abnormal signal is detected, determining a source of the abnormal signal, and if the abnormal signal comes from interference, determining that there is no leakage in the detected pipeline 2, and if the abnormal signal comes from the leakage of the pipeline 2, analyzing and processing the abnormal signal to obtain leakage parameters; and
if the abnormal signal is not detected, determining that the detected pipeline 2 has no leakage.

The interference may refer to other external disturbances that may cause the abnormal signal of coils. For example, airflow, pipeline vibration, etc.

In some embodiments, the signal collection and processing device may determine the source of the abnormal signal in a plurality of ways based on the monitored abnormal signal. For example, the signal collection and processing device may obtain a historical abnormal signal same as the abnormal signal, and determine the source corresponding to the historical abnormal signal as the source of the abnormal signal.

In some embodiments, the signal collection and processing device may monitor a metal powder storage box of a target pipeline section that moves and rotates repeatedly; the target pipeline section including the pipeline section with the abnormal signal on the detected pipeline; determine that the abnormal signal comes from interference in response to a disappearance of the abnormal signal; and determine that the abnormal signal comes from leakage of the detected pipeline in response to repeated occurrences of the abnormal signal.

In some embodiments, the signal collection and processing device monitors current in the coils, and when the abnormal signal is monitored, control the metal powder storage box to move repeatedly within a preset range of a pipeline section where the abnormal signal occurs by sending a control command.

The preset range may be a pipeline section at a certain distance from a location where the abnormal signal occurs. The preset range may be preset by users, set by the system default, or determined after analyzing an actual working condition.

In some embodiments, identifying the source of the abnormal signal includes: repeatedly moving and rotating the metal powder storage box 1 in the pipeline section of the pipeline 2 where the abnormal signal occurs; if the abnormal signal disappears, determining that the abnormal signal is from the interference; and if the abnormal signal occurs repeatedly, determining that the abnormal signal comes from the leakage of the pipeline 2.

In some embodiments, before the metal powder storage box 1 is sleeved on the detected pipeline, the method further includes: determining size parameters of the device for pipeline leakage detection according to feature of the detected pipeline 2 and fluid feature inside the detected pipeline 2; and determining electromagnetic parameters of the device for pipeline leakage detection based on the required accuracy of the detected pipeline 2.

In some embodiments, the size parameters of the device for pipeline leakage detection may be obtained from factory data of the pipeline. A relationship between the detected pipeline and corresponding accuracy may be preset, and the electromagnetic parameters of the device for pipeline leakage detection may be obtained by looking up a table.

In some embodiments, the size parameters include an inner radius $r2$ of the metal powder storage box 1, a thickness $h$ of the metal powder storage box 1, a width $a1$ of the rib 3, a length $b1$ of the rib 3, a thickness $d$ of the rib 3, and an angle $\beta$ between adjacent ribs 3.

A fluid feature refers to the feature related to the fluid itself or the movement of the fluid in the pipeline. For example, the fluid feature may include a viscosity, a pressure, a flow rate, etc. of the fluid.

The feature of the detected pipeline refers to a parameter feature of the pipeline itself. For example, the feature of the detected pipeline may include a material, an inner diameter, an outer diameter, etc. of the pipeline.

Detection accuracy may be accuracy required by an actual working condition. In some embodiments, the detection accuracy may include detection error.

The width of the rib and the thickness of the rib refer to the size parameters of contact surfaces where the ribs are fixed on the metal powder storage box.

In some embodiments, the product of the width and the thickness of the rib (i.e., area of the contact surface) is related to fluid pressure.

In some embodiments, the area of the contact surface increases with an increase of the fluid pressure.

In some embodiments, the area of the contact surface is related to fixation degree of the rib. The fixation degree of the rib refers to firmness degree of the connection between the rib and the metal powder storage box.

In some embodiments, the greater the area of the contact surface, the lower the fixation degree of the rib.

In some embodiments, the inner radius r2 is affected by an outer diameter of the detected pipeline 2, and the inner radius r2 is equal to or slightly larger than the outer diameter of the detected pipeline 2; the thickness h is affected by an internal fluid feature, and the thickness h decreases with an increase of an internal fluid viscosity coefficient; when fluid with a large viscosity coefficient is in motion, an original motion state is more likely to be affected, therefore, the thickness h should be reduced to reduce time of the fluid moving in the metal powder storage box 1. Sizes of the ribs 3 are affected by the size of the detected pipeline 2 and the fluid feature, and the angle β between adjacent ribs 3 decreases as the size of the pipeline 2 increases, and the width a1 of the rib 3 should increase with an increase of the fluid pressure. The length b1 of the rib is affected by the size of the detected pipeline 2 and actual detection needs. For example, a curvature of the detected pipeline 2 represents bending degree of the pipeline 2, for the pipeline 2 with large curvature, if the length b1 of the rib 3 is too large, the device may not fit the outer wall of the pipeline 2 completely, so the device may not work properly; values of a1 and b1 jointly determine a number of the coils 4 in the rib 3, and the setting of the number of the coils 4 is related to the detection accuracy, so the values of a1 and b1 should also consider the detection accuracy. A value of thickness d of the rib 3 should make the rib 3 fixed; coils are arranged inside the ribs 3, and the thickness of the rib 3 is reduced as much as possible to reduce the influence on the strength of the magnetic field and avoid leaked fluid from changing its original motion state due to the influence of the ribs 3.

In some embodiments, the electromagnetic parameters include a current I, current frequency ω, a current direction T, turns n of coil 4, radius r1 of coil 4, metal magnetic permeability μ, electrical conductivity σ, a center-to-center distance a2 of adjacent coils 4 in the width direction of a rib 3, a center-to-center distance b2 of adjacent coils 4 in the length direction of a rib 3.

In some embodiments, after a1 and b1 are determined, the value of r1 may determine a number of coil 4, and the denser the coil 4 is arranged, the higher the precision of detection results may be obtained. The induced electromotive force generated by coil 4 is proportional to the turns n of coil, and the value of n affects the change of magnetic field intensity. Parameters such as the current I, the current frequency ω, the turns n of coil, the radius r1 of coil, the metal magnetic permeability μ, and the electrical conductivity σ also affect the magnetic field in which the device detects leakage.

In some embodiments, the processor may determine the leakage velocity based on abnormal signal of two adjacent coils. For example, the processor may determine a time interval between an abnormal signal A and an abnormal signal B based on the abnormal signal A of coil I and the abnormal signal B of coil II; the processor may pre-store a relationship of the coil I, the coil II and a center-to-center distance between the coil I and the coil II, and obtain the center-to-center distance between the coil I and the coil II based on the look-up table mean; and the leakage velocity is obtained based on the center-to-center distance and the time interval.

The leakage parameters may include the leakage velocity. In some embodiments, obtaining the leakage velocity by analyzing and processing the abnormal signal by the processor may comprises: obtaining a moment when a certain metal particle passes through the corresponding coil 4 according to time-varying current data of the coil 4 with the abnormal signal; wherein a certain metal particle is a particle in the metal powder ejected from the metal powder storage box 1 and located in a laminar flow zone; and obtaining the leakage velocity based on the center-to-center distance of the corresponding coils 4 and the moment.

A calculation process of the above leakage velocity is described in detail below with a specific example.

Figure 6:
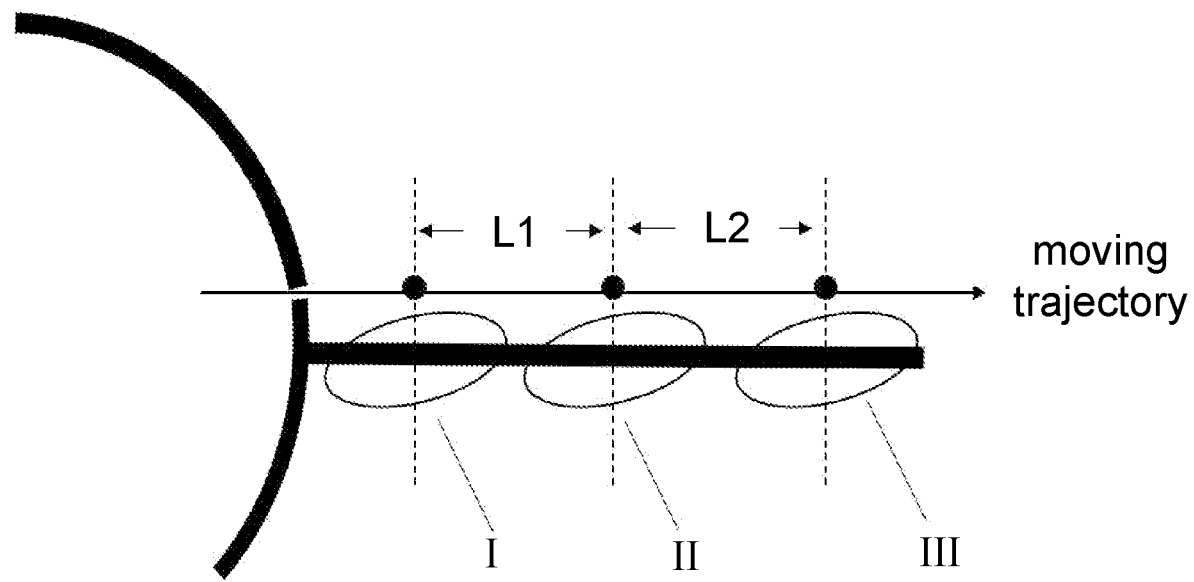
FIG. 6 is a diagram illustrating a working condition of pipeline leakage detected by the device for pipeline leakage in some embodiments of the present disclosure.

FIG. 6 demonstrates a leakage condition in which a pipeline 2 leaks and an internal high-pressure fluid medium is ejected. During the process of the ejection, the metal powder in the metal powder storage box 1 moves together with the fluid medium, and a moving trajectory is shown in FIG. 6. At this time, it is considered that motion features of the metal powder are the same as those of the ejected fluid medium. The metal powder in a laminar flow zone passes through coils 4 arranged in a certain rib 3 sequentially during the movement.

The metal powder in the powder storage box 1 at the leakage location may move outward with the medium under the push of the leaked fluid medium. A movement law of the metal powder is the same as a kinetic law of movement when the fluid medium leaks. The metal powder moves in a magnetic field between ribs 3 causing an eddy current inside the metal powder, and the eddy current and a current of coils 4 cause an original magnetic field to change due to a mutual inductance phenomenon, resulting in the change of the current of coils 4 and generating abnormal signals.

Tables 1-3 list changes in currents over time of three coils 4 located in the laminar flow zone when the device works under this working condition. In particular, it is pointed out that the number of coils 4 varies according to actual working conditions, and setting three coils 4 here may meet calculation needs. The three coils 4 are sequentially marked as coil I, coil II, and coil III from a proximal tube side to a distal tube side.

TABLE 1

| current change of coil I | |
|---|---|
| Time t/μs | Current I/mA |
| 1 | 79.19789 |
| 2 | 79.21037 |
| 3 | 79.20286 |
| 4 | 79.21534 |
| 5 | 79.20783 |
| 6 | 79.21031 |
| 7 | 79.2128 |
| 8 | 79.20528 |
| 9 | 79.21776 |
| 10 | 79.22025 |
| 11 | 79.21273 |
| 12 | 79.22522 |
| 13 | 79.2177 |
| 14 | 79.23019 |
| 15 | 79.21267 |
| 16 | 79.21516 |
| 17 | 79.21764 |
| 18 | 79.22012 |
| 19 | 79.22261 |
| 20 | 79.21509 |
| 21 | 79.21758 |
| 22 | 79.22006 |
| 23 | 79.22255 |
| 24 | 79.22503 |
| 25 | 79.21752 |
| 26 | 79.23 |
| 27 | 79.22248 |
| 28 | 79.22497 |
| 29 | 79.22745 |
| 30 | 79.21994 |
| 31 | 79.22242 |
| 32 | 79.22491 |
| 33 | 79.22739 |

TABLE 1-continued current change of coil I

| Time t/μs | Current I/mA |
|---|---|
| 34 | 79.22988 |
| 35 | 79.22236 |
| 36 | 79.22485 |
| 37 | 79.23733 |
| 38 | 79.23981 |
| 39 | 79.2323 |
| 40 | 79.23478 |
| 41 | 79.23727 |
| 42 | 79.23975 |
| 43 | 79.23224 |
| 44 | 79.23472 |
| 45 | 79.22721 |
| 46 | 79.22969 |
| 47 | 79.23217 |
| 48 | 79.24466 |
| 49 | 79.23714 |
| 50 | 79.23963 |
| 51 | 79.24211 |
| 52 | 79.2346 |
| 53 | 79.24708 |
| 54 | 79.24957 |
| 55 | 79.24205 |
| 56 | 79.23453 |
| 57 | 79.24702 |
| 58 | 79.2495 |
| 59 | 79.25199 |
| 60 | 79.25447 |
| 61 | 79.24696 |
| 62 | 79.24944 |
| 63 | 79.24193 |
| 64 | 79.24441 |
| 65 | 79.24689 |
| 66 | 79.24938 |
| 67 | 79.25186 |
| 68 | 79.25435 |
| 69 | 79.24683 |
| 70 | 79.24932 |
| 71 | 79.2518 |
| 72 | 79.25429 |
| 73 | 79.25677 |
| 74 | 79.25926 |
| 75 | 79.26174 |
| 76 | 79.26422 |
| 77 | 79.26671 |
| 78 | 79.25919 |
| 79 | 79.26168 |
| 80 | 79.26416 |
| 81 | 79.26665 |
| 82 | 79.25913 |
| 83 | 79.26162 |
| 84 | 79.2641 |
| 85 | 79.26658 |
| 86 | 79.26907 |
| 87 | 79.26155 |
| 88 | 79.26404 |
| 89 | 79.26652 |
| 90 | 79.26901 |
| 91 | 79.27149 |
| 92 | 79.27398 |
| 93 | 79.26646 |
| 94 | 79.26894 |
| 95 | 79.26143 |
| 96 | 79.27391 |
| 97 | 79.2664 |
| 98 | 79.26888 |
| 99 | 79.28137 |
| 100 | 79.27385 |
| 101 | 79.27634 |
| 102 | 79.27882 |
| 103 | 79.2713 |
| 104 | 79.27379 |
| 105 | 79.26627 |
| 106 | 79.27876 |
| 107 | 79.28124 |
| 108 | 79.27373 |
| 109 | 79.27621 |

TABLE 1-continued current change of coil I

| Time t/μs | Current I/mA |
|---|---|
| 110 | 79.2687 |
| 111 | 79.27118 |
| 112 | 79.27367 |
| 113 | 79.28615 |
| 114 | 79.28863 |
| 115 | 79.28112 |
| 116 | 79.2836 |
| 117 | 79.28609 |
| 118 | 79.27857 |
| 119 | 79.28106 |
| 120 | 79.28354 |
| 121 | 79.28603 |
| 122 | 79.27851 |
| ... | ... |

TABLE 2 current change of coil II

| Time t/μs | Current I/mA |
|---|---|
| 1 | 79.70894 |
| 2 | 79.66143 |
| 3 | 79.63391 |
| 4 | 79.6164 |
| 5 | 79.60888 |
| 6 | 79.64137 |
| 7 | 79.64385 |
| 8 | 79.60634 |
| 9 | 79.58882 |
| 10 | 79.5713 |
| 11 | 79.56379 |
| 12 | 79.55627 |
| 13 | 79.54876 |
| 14 | 79.54124 |
| 15 | 79.52373 |
| 16 | 79.52621 |
| 17 | 79.5287 |
| 18 | 79.53118 |
| 19 | 79.52367 |
| 20 | 79.52615 |
| 21 | 79.52863 |
| 22 | 79.54112 |
| 23 | 79.5436 |
| 24 | 79.53609 |
| 25 | 79.54857 |
| 26 | 79.55106 |
| 27 | 79.55354 |
| 28 | 79.54603 |
| 29 | 79.55851 |
| 30 | 79.55099 |
| 31 | 79.55348 |
| 32 | 79.55596 |
| 33 | 79.54845 |
| 34 | 79.55093 |
| 35 | 79.56342 |
| 36 | 79.5559 |
| 37 | 79.55839 |
| 38 | 79.56087 |
| 39 | 79.56335 |
| 40 | 79.56584 |
| 41 | 79.55832 |
| 42 | 79.56081 |
| 43 | 79.56329 |
| 44 | 79.56578 |
| 45 | 79.55826 |
| 46 | 79.56075 |
| 47 | 79.56323 |
| 48 | 79.56571 |
| 49 | 79.5582 |
| 50 | 79.56068 |
| 51 | 79.55317 |
| 52 | 79.56565 |

TABLE 2-continued current change of coil II

| Time t/μs | Current I/mA |
|---|---|
| 53 | 79.55814 |
| 54 | 79.55062 |
| 55 | 79.55311 |
| 56 | 79.55559 |
| 57 | 79.54808 |
| 58 | 79.55056 |
| 59 | 79.54304 |
| 60 | 79.54553 |
| 61 | 79.53801 |
| 62 | 79.5405 |
| 63 | 79.53298 |
| 64 | 79.53547 |
| 65 | 79.53795 |
| 66 | 79.54044 |
| 67 | 79.53292 |
| 68 | 79.5354 |
| 69 | 79.52789 |
| 70 | 79.52037 |
| 71 | 79.52286 |
| 72 | 79.52534 |
| 73 | 79.51783 |
| 74 | 79.52031 |
| 75 | 79.5128 |
| 76 | 79.51528 |
| 77 | 79.51776 |
| 78 | 79.52025 |
| 79 | 79.51273 |
| 80 | 79.50522 |
| 81 | 79.5077 |
| 82 | 79.51019 |
| 83 | 80.05621 |
| 84 | 80.0587 |
| 85 | 80.06118 |
| 86 | 80.06367 |
| 87 | 80.05615 |
| 88 | 80.06863 |
| 89 | 80.06112 |
| 90 | 80.0736 |
| 91 | 80.06609 |
| 92 | 80.05857 |
| 93 | 80.07106 |
| 94 | 80.06354 |
| 95 | 80.06603 |
| 96 | 80.06851 |
| 97 | 80.07099 |
| 98 | 80.06348 |
| 99 | 80.06596 |
| 100 | 80.06845 |
| 101 | 80.06093 |
| 102 | 80.06342 |
| 103 | 80.0659 |
| 104 | 80.05839 |
| 105 | 80.06087 |
| 106 | 80.05335 |
| 107 | 80.06584 |
| 108 | 80.06832 |
| 109 | 80.07081 |
| 110 | 80.06329 |
| 111 | 80.06578 |
| 112 | 80.06826 |
| 113 | 80.06075 |
| 114 | 80.06323 |
| 115 | 80.05571 |
| 116 | 80.0682 |
| 117 | 80.06068 |
| 118 | 80.06317 |
| 119 | 80.05565 |
| 120 | 80.05814 |
| 121 | 80.07062 |
| 122 | 80.06311 |
| ... | ... |

TABLE 3 current change of coil III

| Time t/μs | Current I/mA |
|---|---|
| 1 | 80.07248 |
| 2 | 80.06497 |
| 3 | 80.06745 |
| 4 | 80.05994 |
| 5 | 80.06242 |
| 6 | 80.06491 |
| 7 | 80.05739 |
| 8 | 80.06988 |
| 9 | 80.06236 |
| 10 | 80.06485 |
| 11 | 80.06733 |
| 12 | 80.06981 |
| 13 | 80.0723 |
| 14 | 80.06478 |
| 15 | 80.06727 |
| 16 | 80.06975 |
| 17 | 80.07224 |
| 18 | 80.06472 |
| 19 | 80.06721 |
| 20 | 80.06969 |
| 21 | 80.07217 |
| 22 | 80.06466 |
| 23 | 80.06714 |
| 24 | 80.05963 |
| 25 | 80.07211 |
| 26 | 80.0646 |
| 27 | 80.07708 |
| 28 | 80.06957 |
| 29 | 80.06205 |
| 30 | 80.06453 |
| 31 | 80.06702 |
| 32 | 80.0595 |
| 33 | 80.06199 |
| 34 | 80.06447 |
| 35 | 80.05696 |
| 36 | 80.06944 |
| 37 | 80.06193 |
| 38 | 80.06441 |
| 39 | 80.06689 |
| 40 | 80.05938 |
| 41 | 80.06186 |
| 42 | 80.06435 |
| 43 | 80.06683 |
| 44 | 80.06932 |
| 45 | 80.0618 |
| 46 | 80.06429 |
| 47 | 80.06677 |
| 48 | 80.06926 |
| 49 | 80.06174 |
| 50 | 80.06422 |
| 51 | 80.06671 |
| 52 | 80.06919 |
| 53 | 80.06168 |
| 54 | 80.06416 |
| 55 | 80.05665 |
| 56 | 80.05913 |
| 57 | 80.06162 |
| 58 | 80.0741 |
| 59 | 80.06658 |
| 60 | 80.05907 |
| 61 | 80.06155 |
| 62 | 80.07404 |
| 63 | 80.06652 |
| 64 | 80.07901 |
| 65 | 80.06149 |
| 66 | 80.06398 |
| 67 | 80.06646 |
| 68 | 80.05894 |
| 69 | 80.06143 |
| 70 | 80.06391 |
| 71 | 80.0764 |
| 72 | 80.06888 |
| 73 | 80.07137 |
| 74 | 80.06385 |
| 75 | 80.06634 |
| 76 | 80.06882 |

TABLE 3-continued current change of coil III

| Time t/μs | Current I/mA |
|---|---|
| 77 | 80.0613 |
| 78 | 80.05379 |
| 79 | 80.06627 |
| 80 | 80.05876 |
| 81 | 80.07124 |
| 82 | 80.06373 |
| 83 | 80.05621 |
| 84 | 80.0587 |
| 85 | 80.06118 |
| 86 | 80.06367 |
| 87 | 80.05615 |
| 88 | 80.06863 |
| 89 | 80.06112 |
| 90 | 80.0736 |
| 91 | 80.06609 |
| 92 | 80.05857 |
| 93 | 80.07106 |
| 94 | 80.06354 |
| 95 | 80.06603 |
| 96 | 80.06851 |
| 97 | 80.07099 |
| 98 | 80.06348 |
| 99 | 80.06596 |
| 100 | 80.06845 |
| 101 | 80.06093 |
| 102 | 80.06342 |
| 103 | 80.0659 |
| 104 | 80.05839 |
| 105 | 80.06087 |
| 106 | 80.05335 |
| 107 | 80.06584 |
| 108 | 80.06832 |
| 109 | 80.07081 |
| 110 | 80.06329 |
| 111 | 80.06578 |
| 112 | 80.06826 |
| 113 | 80.06075 |
| 114 | 80.06323 |
| 115 | 80.05571 |
| 116 | 80.0682 |
| 117 | 80.06068 |
| 118 | 80.06317 |
| 119 | 80.05565 |
| 120 | 80.05814 |
| 121 | 80.07062 |
| 122 | 80.06311 |
| ... | ... |

Figure 7:
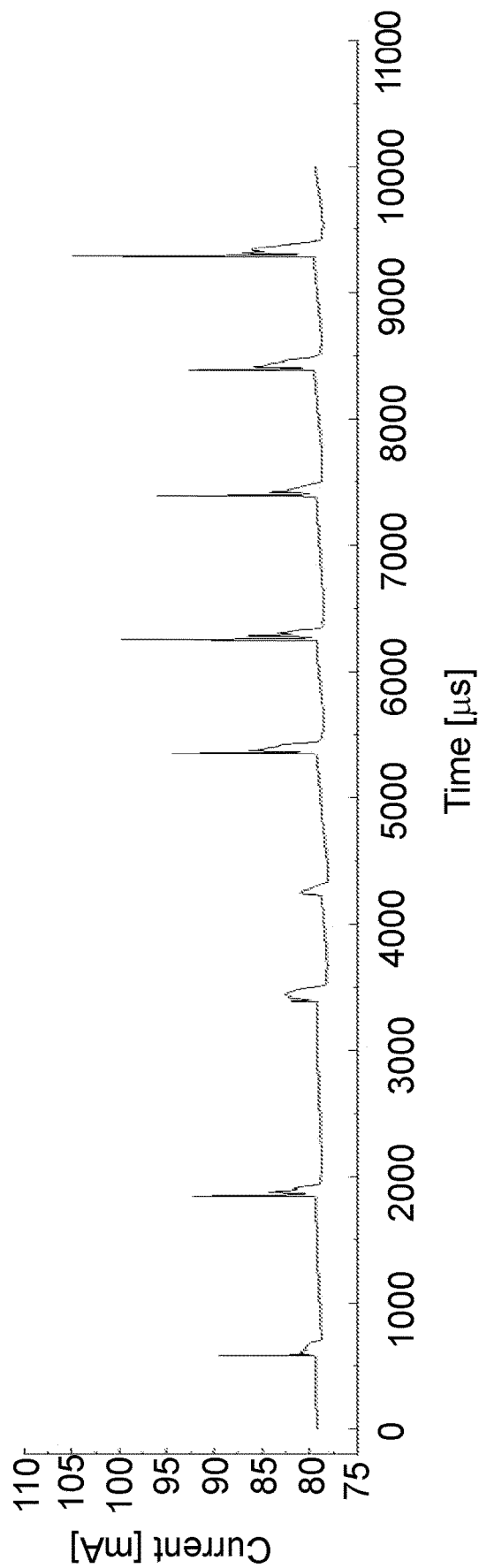
FIG. 7 is a graph illustrating a current change of coil I in some embodiments of the present disclosure.
Figure 8:
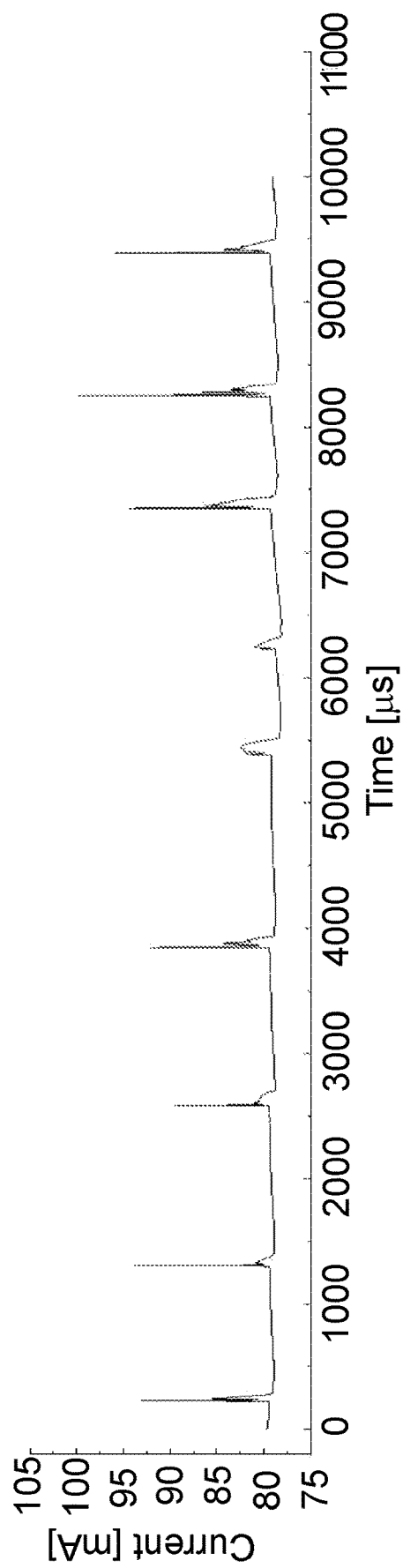
FIG. 8 is a graph illustrating a current change of coil II in some embodiments of the present disclosure.
Figure 9:
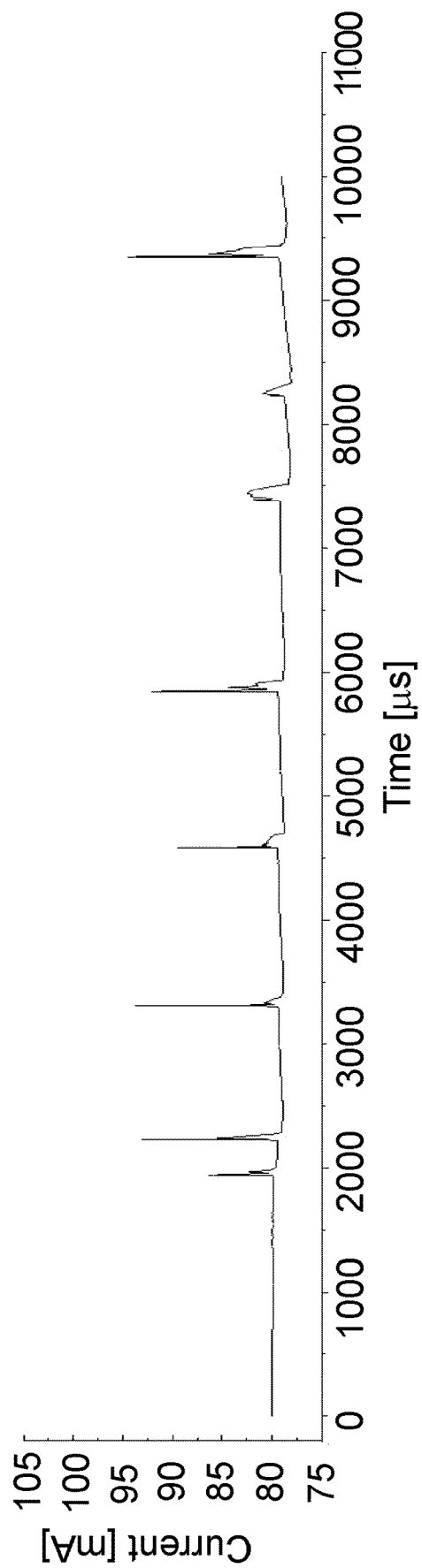
FIG. 9 is a graph illustrating a current change of coil III in some embodiments of the present disclosure.

In order to visually display the current change of the coils 4, data in above three tables are plotted into a graph. FIG. 7 is a graph illustrating a current change of coil I; FIG. 8 is a graph illustrating a current change of coil II; and FIG. 9 is a graph illustrating a current change of coil III. Compared with the current of the coils 4 when no leakage is detected, when there are metal particles moving on the side of the coils 4, the current may fluctuate due to a change of the magnetic field. Through an analysis of fluctuation, a motion state of the metal particles may be obtained, so as to deduce a current leakage situation.

A same metal particle may sequentially pass through the coils 4 on moving trajectory, so the same metal particle has similar effect on the magnetic field of the coils 4 on the moving trajectory. Combined with analysis of FIGS. 7-9, metal particles moving in the magnetic field have an impact on the magnetic field of the coils 4, and the impact may be intuitively reflected as an impact on a current of the coils 4. By analyzing fluctuation in FIGS. 7-9 and combining with factors such as change rates, peak values, cycles, etc. of curves, the processor may determine that waveforms with same features in current changes of different coils are caused by the movement of the same particle.

Combined with relative distance locations of the coils 4 on the ribs 3, and the time when waveforms with same features appear on different coils, a moving speed of the particle may be calculated according to $$v = \frac{\Delta L}{\Delta t}.$$

Where ΔL is a center-to-center distance between two coils 4; Δt is time for the metal particles to pass through the center-to-center distance between the two coils 4 in sequence; v is velocity of the metal particles between the center-to-center distance of the two coils 4. The more the number of the coils 4 arranged on the ribs 3 with a same size, the higher the accuracy of obtained data.

Figure 10:
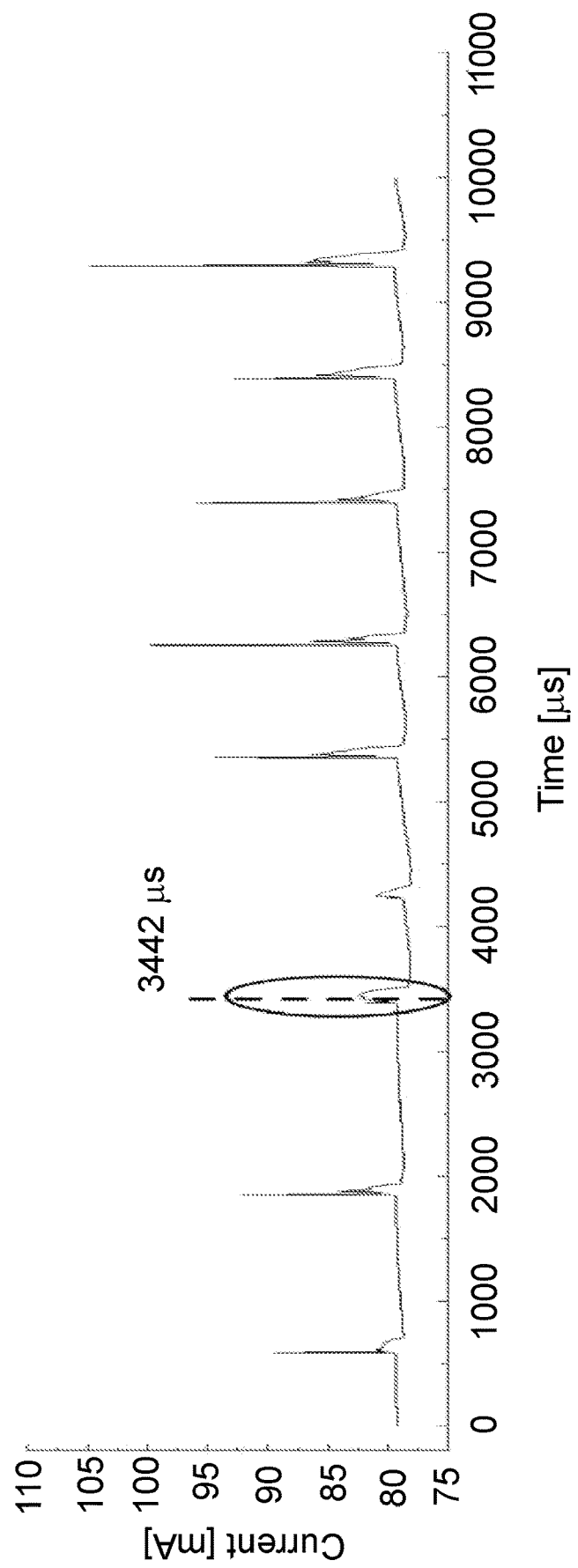
FIG. 10 is a graph illustrating the current change of coil I with selecting a special current change and marking a corresponding moment in some embodiments of the present disclosure.
Figure 11:
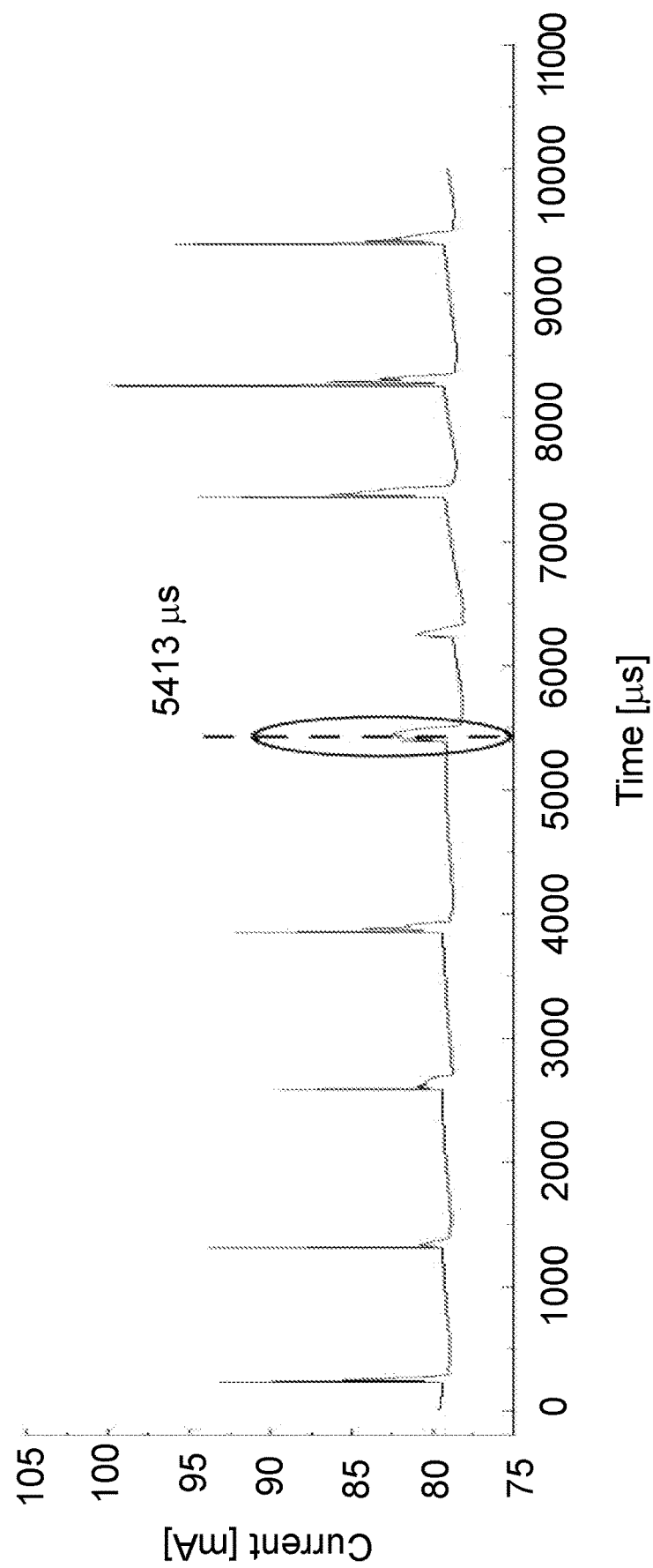
FIG. 11 is a graph illustrating the current change of coil II with selecting a special current change and marking a corresponding moment in some embodiments of the present disclosure.
Figure 12:
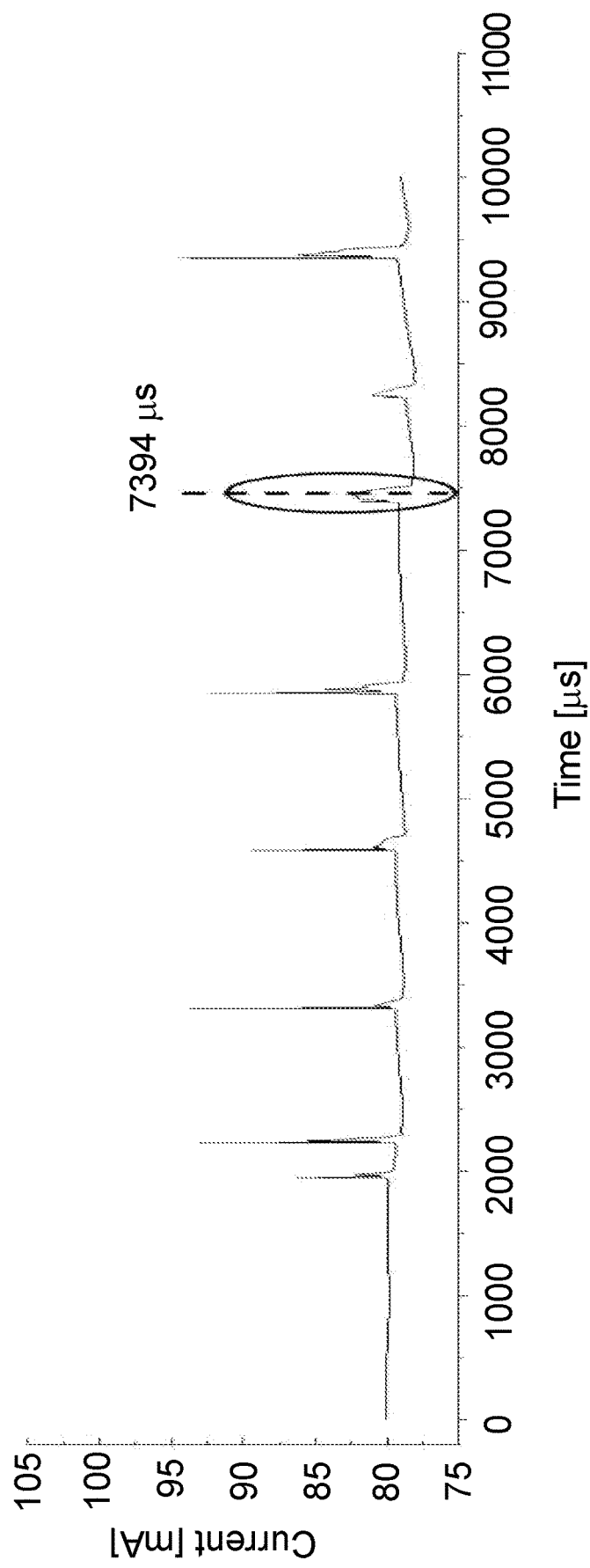
FIG. 12 is a graph illustrating the current change of coil III with selecting a special current change and marking a corresponding moment in some embodiments of the present disclosure.

Combining FIGS. 7-9, it may be concluded that fluctuation with a same feature caused by a same metal particle passing through different coils 4. FIG. 10 is a graph illustrating the current change of coil I with selecting a special current change and marking a corresponding moment in some embodiments of the present disclosure; FIG. 11 is a graph illustrating the current change of coil II with selecting a special current change and marking a corresponding moment in some embodiments of the present disclosure; and FIG. 12 is a graph illustrating the current change of coil III with selecting a special current change and marking a corresponding moment in some embodiments of the present disclosure; FIGS. 10-12 show similar waveforms and corresponding moments selected for this calculation.

As shown in FIG. 6, L1 is a center-to-center distance between the coil I and the coil II, L2 is a center-to-center distance between the coil II and the coil III, and L1+L2 is a center-to-center distance between the coil I and the coil III, all of which may be obtained by measuring.

TABLE 4

Center locations of three coils 4 and center-to-center distances of every two coils

| | coil | | |
|---|---|---|---|
| ΔL coil | coil I (5.23 cm) | coil II (10.47 cm) | coil III (15.61 cm) |
| coil I (5.23 cm) | 0 cm | 5.24 cm | 10.38 cm |
| coil II (10.47 cm) | | 0 cm | 5.14 cm |
| coil III (15.61 cm) | | | 0 cm |

TABLE 5

Moment when the metal particle passes through center of the coil 4 and time of passing the center-to-center distances of every two coils

| | coil | | |
|---|---|---|---|
| Δt coil | coil I (3442 μs) | coil II (5413 μs) | coil III (7394 μs) |
| coil I (3442 μs) | 0 μs | 1971 μs | 3952 μs |
| coil II (5413 μs) | | 0 μs | 1981 μs |
| coil III (7394 μs) | | | 0 μs |

After calculation, the moving speeds of the metal particle may be obtained, as shown in Table 5.

TABLE 5

Speed of the metal particle passing through the center-to-center distance of different coils

| v | coil | | |
|---|---|---|---|
| coil | coil I | coil II | coil III |
| coil I | 0 m/s | 26.585 m/s | 26.265 m/s |
| coil II | | 0 m/s | 25.946 m/s |
| coil III | | | 0 m/s |

From this, a moving speed of the metal particle through the center-to-center distance between the coil I and the coil II is 26.585 m/s; a moving speed of the metal particle through the center-to-center distance between the coil II and the coil III is 25.946 m/s; and a moving speed of the metal particle through the center-to-center distance between the coil I and the coil III is 26.265 m/s. Because the moving speed of the metal particle is consistent with a speed of the fluid medium due to leakage ejection, the leakage velocity is an average value of above three speeds, and a pipeline leakage speed V is 26.265 m/s.

In some embodiments, leakage parameters also include leakage amount per unit time and a leakage hole shape; and obtaining the leakage amount per unit time and the leakage hole shape by analyzing and processing the abnormal signal by the processor may include: determining a leakage hole area based on the abnormal signal; obtaining the leakage amount per unit time based on the leakage velocity and the leakage hole area; determining a gas leakage coefficient based on the leakage amount per unit time; and obtaining the leakage hole shape based on the gas leakage coefficient.

In this embodiment, the leakage parameters also include leakage amount per unit time and a leakage hole shape; and obtaining the leakage amount per unit time and the leakage hole shape by analyzing and processing the abnormal signal by the processor may comprise: obtaining the leakage hole area A based on the abnormal signal caused by a turbulence area; calculating leakage amount per unit time Q according to Q=AV; in the case that fluid in the pipeline 2 is gas, obtaining the leakage hole shape based on a gas leakage coefficient calculated according to $$\frac{Q}{YAP\sqrt{\frac{M\gamma}{Rgt}\left(\frac{2}{\gamma+1}\right)^{\frac{\gamma+1}{\gamma-1}}}};$$

where $C_d$ denotes the gas leakage coefficient, taking 1.00 for a circle, 0.95 for a triangle, and 0.90 for a rectangle; P denotes a fluid pressure in a pipeline 1; M denotes relative molecular mass of fluid transported in a pipeline; Rg is a universal gas constant; t denotes a gas temperature: Y denotes a gas outflow coefficient, and the calculation formula is $$Y = \frac{P0^{\frac{1}{\gamma}}}{P} \times \left\{\frac{P0^{\frac{\gamma-1}{\gamma}}}{P}\right\}^{\frac{1}{2}} \times \left\{\frac{2}{\gamma-1} \times \frac{\gamma+1}{2}^{\frac{\gamma+1}{\gamma-1}}\right\}^{\frac{1}{2}};$$

where P denotes a gas pressure in the pipeline 1; P0 denotes an environmental pressure; and γ denotes an adiabatic coefficient, which is a constant.

In some embodiments, the processor may determine the leakage hole area based on a plurality of ways. For example, the processor may construct a feature vector based on abnormal signal, pipeline feature, fluid feature, etc. in historical pipeline transmission data; and retrieve in the database based on the vector feature, and determine a historical feature vector whose vector distance satisfies a distance threshold. The area of a historical leakage hole stored in association with the historical feature vector is determined as the currently calculated area of the leakage hole. The database is configured to store the historical feature vector constructed based on historical abnormal signals, historical pipeline features, and historical fluid features, and area of historical leakage holes corresponding to each historical feature vector.

In some embodiments, for fluid in the pipeline 1, if the fluid is gas, the gas may cause different consequences through different leakage hole shape, so it is necessary to roughly determine the leakage hole shape. However, if the fluid in pipeline 1 is a liquid, it is usually to consider the leakage hole shape.

In some embodiments, when fluid in the pipeline 2 is gas, the calculated value $C_d$ is compared with three values of 1.00, 0.95, and 0.90 to find out which value the calculated value is closer to, and then the leakage hole shape closer to a shape corresponding to the closer value may be roughly determined, so as to determine possible consequences of a leakage hole of this shape.

In some embodiments, if the fluid transported in the pipeline 2 is mixed gas, value $C_d$ corresponding to each gas is calculated first, then, according to proportions of various gas in the mixed gas, a final value is calculated based on the corresponding weight, and the leakage hole shape is determined based on the final value.

Figure 13:
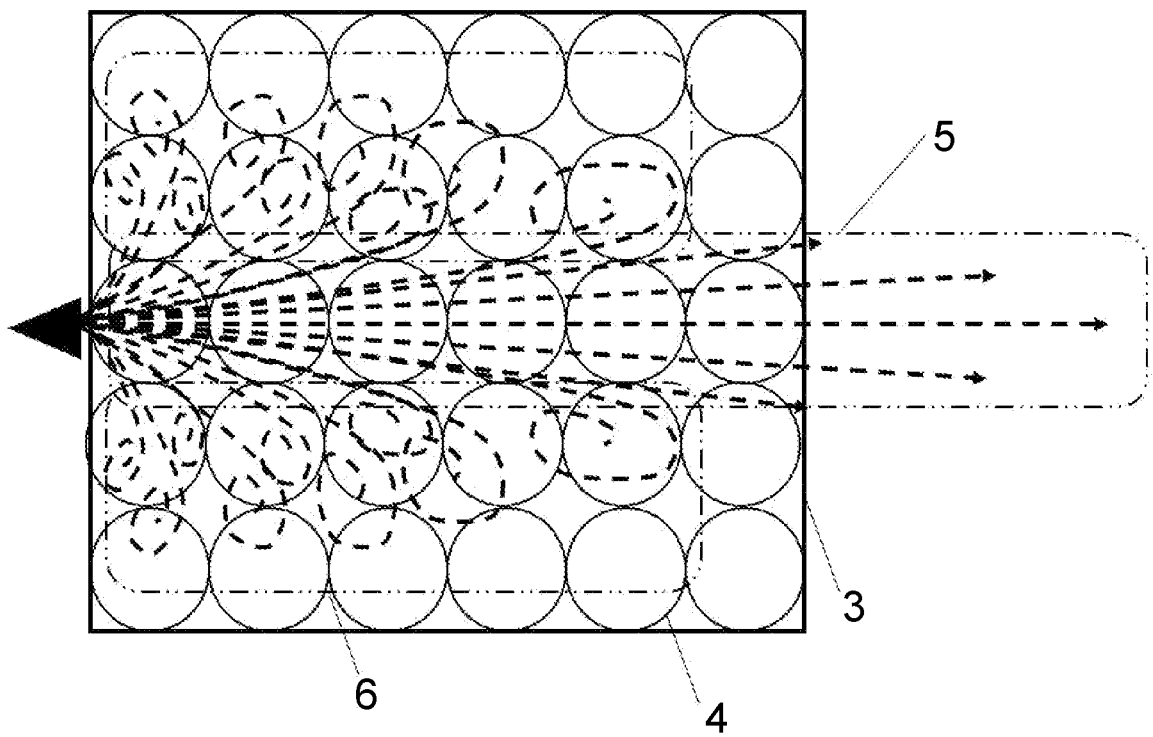
FIG. 13 is a schematic diagram illustrating an analysis and calculation of leakage amount per unit time and a leakage hole shape in some embodiments of the present disclosure.

FIG. 13 is a schematic diagram illustrating an analysis and calculation of leakage amount per unit time and a leakage hole shape. As shown in FIG. 13, fluid medium is ejected from a leakage location of the pipeline 2, and metal powder in the metal powder storage box 1 may move along with the fluid medium between ribs 3 with a same movement feature. The fluid medium ejected from a center of the leakage location may be less affected by the outside world, so a laminar flow may be maintained at a relatively long distance. As a laminar flow zone 5 shown in FIG. 13, a flow state of this part of the fluid medium is close to a movement state in the leakage. Therefore, the metal powder in this zone is used to calculate the leakage velocity of the pipeline. At the same time, the fluid medium around the laminar flow zone 5 is easily affected by the outside world during an outward ejection process, and an original movement state cannot be continuously maintained due to disturbance. According to knowledge of fluid mechanics, a turbulent flow phenomenon shown in FIG. 13 may be formed in this zone. As turbulence zone 6 shown in FIG. 13, when the turbulent flow phenomenon occurs, coils 4 on a side of the turbulence zone 6 are affected by metal particles that maintain the same movement state as the fluid medium in the turbulence zone 6, resulting in an abnormal signal. By analyzing the abnormal signal, degree of the turbulent flow phenomenon of the medium between the ribs 3 may be obtained. Determinants of the degree of the turbulent flow phenomenon includes leakage velocity at the leakage location, the area of the leakage hole, and density of external medium. By analyzing the abnormal signal generated by turbulent flow between the ribs 3, the area of the leakage hole A may be obtained, and then the leakage amount per unit time Q at the leakage location of the pipeline 2 may be calculated. When the device analyzes and calculates the leakage amount of the pipeline, the leakage hole is equivalent to a circular leakage hole, and then the leakage hole shape is further analyzed based on the leakage amount per unit time Q.

$$C_d = \frac{Q}{YAP\sqrt{\frac{M\gamma}{Rgt}\left(\frac{2}{\gamma+1}\right)^{\frac{\gamma+1}{\gamma-1}}}}$$

is obtained according to $$Q = YC_dAP\sqrt{\frac{M\gamma}{Rgt}\left(\frac{2}{\gamma+1}\right)^{\frac{\gamma+1}{\gamma-1}}}.$$

In some embodiments, the leakage parameters may also include a leakage location, and the obtaining the leakage location by analyzing and processing the abnormal signal by the processor may comprise: monitoring the metal powder storage box that reciprocates along an axial direction of a detected pipeline by a signal collection and processing device, when a number of the coil with abnormal signal meets a preset condition, stopping reciprocation; and when a change degree of coils of the metal powder storage box in two adjacent ribs is the same, stopping the rotation, and determining the midpoint of an area between the two adjacent ribs as the leakage location.

In some embodiments, the preset condition includes that the change degree of the coils in two adjacent ribs is the same.

The leakage parameters include the leakage location. In some embodiments, the processor may obtain the leakage location by analyzing and processing an obtained abnormal signal may comprise: firstly, reciprocating the metal powder storage box 1 along an axial direction in the leakage section of the pipeline 2, and when a number of coils 4 with abnormal signals reaches a maximum value, stopping reciprocation; then, rotating the metal powder storage box 1, and when change degree of coils 4 in two adjacent ribs 3 is the same, stopping rotation, then determining a midpoint of an area between the two adjacent ribs 3 as the leakage location.

Figure 14:
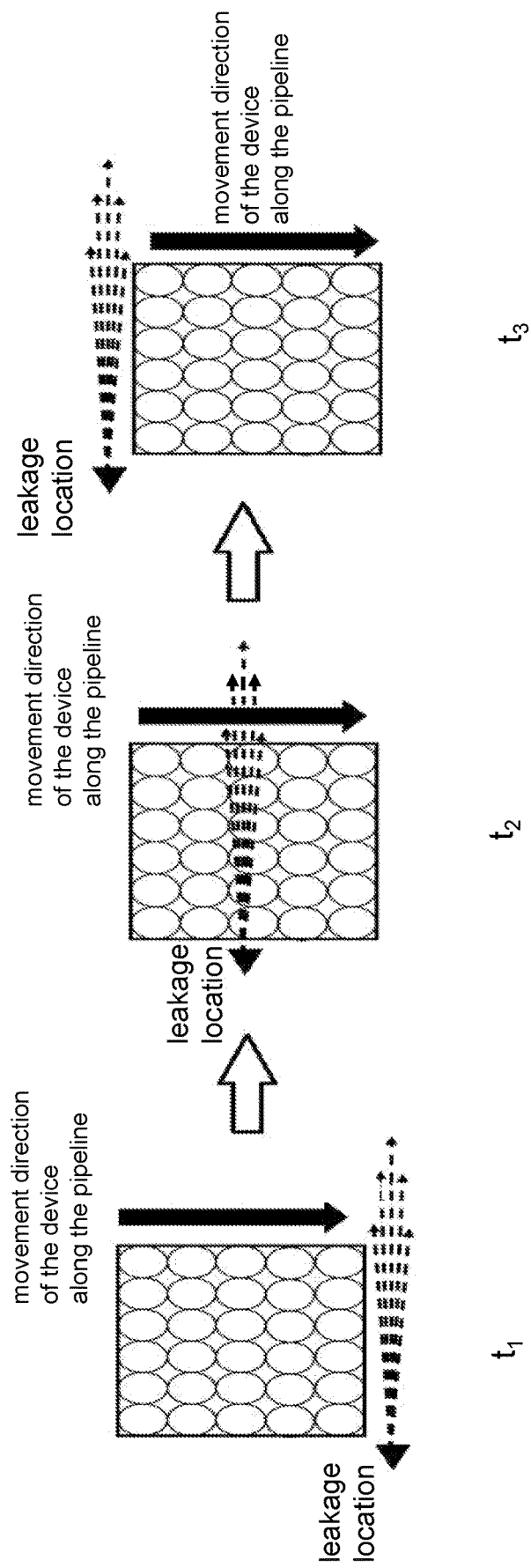
FIG. 14 is a diagram illustrating a change of a device for pipeline leakage detection reciprocating along an axial direction in a pipeline leakage section in some embodiments of the present disclosure.

In some embodiments, after it is determined that the abnormal signal comes from a pipeline leakage, the device for pipeline leakage detection is reciprocated along an axial direction in the leakage section of the pipeline 2, and when moving ribs to pass through the pipeline leakage location, the moving ribs may go through three processes shown in FIG. 14. When moving to time $t_1$, current of the coils 4 in corresponding rib 3 may have an abnormal signal, and when a middle location of the rib 3 passes through the leakage location, a number of coils 4 with the abnormal signal may reach the maximum, that is, the situation shown at time $t_2$ in FIG. 14. If the rib 3 continues to move, the number of coils 4 with the abnormal signal may decrease, that is, the situation shown at time $t_3$ in FIG. 14. Therefore, when the device moves at time $t_2$, the leakage location is on a circumference of the line connecting a midpoint at the bottom of the rib 3.

Figure 15:
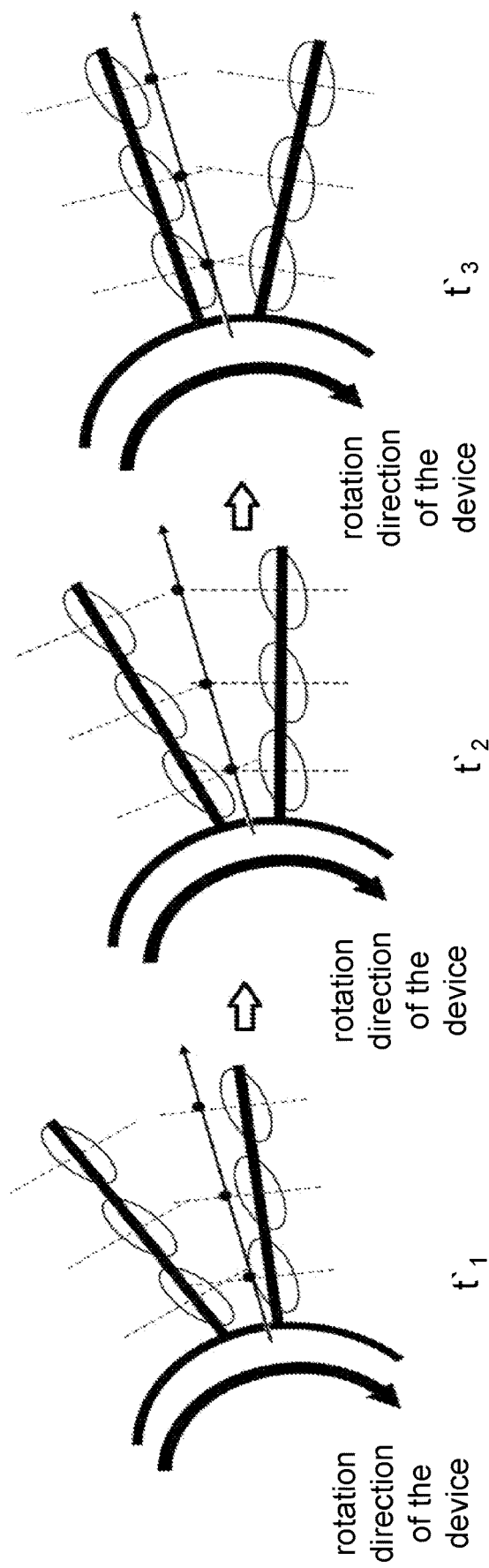
FIG. 15 is a diagram illustrating a change of the device for pipeline leakage detection rotating at a pipeline leakage location in some embodiments of the present disclosure.

After determining the circumference of the pipeline 2 where the leakage location is located, as shown in FIG. 15, a specific location of a leakage point on the circumference may be determined. Specific principles are as follows: rotating the device in a manner shown in FIG. 15, a location of the leakage point may experience three moments $t'_1$, $t'_2$, $t'_3$ in sequence with time. When rotating the device, the change of current may be observed at the same time. When the device moves to the time of $t'_2$, a change degree of current of coils 4 on two ribs 3 on both sides of the leakage location may be the same, that is, when the device is at a time of $t'_2$ in FIG. 15, the leakage point is at a midpoint where the above circumference passes through the two ribs 3.

From this, the specific location of the leakage point may be determined. That is, when a location of the device satisfies the location shown at time $t'_2$ in FIGS. 14 and $t'_2$ in FIG. 15, the leakage point is located at a midpoint of an area between roots of the two ribs 3 shown.

Some embodiments of the present disclosure can accurately and conveniently obtain the leakage velocity, the leakage amount per unit time, the leakage hole shape, and the leakage location, improving the accuracy of locating.

In some embodiments, the device for pipeline leakage detection further includes a driving device and a processor, and the driving device is configured to drive the metal powder storage box to move.

The driving device may be a device equipped with a powered part and used for driving, such as a pipeline crawling robot. In some embodiments, the driving device may be combined with intelligent detection technology to control the movement of the device for pipeline leakage detection, which is especially suitable for a pipeline in an exposed state, making the detection process more intelligent.

In some embodiments, the device for pipeline leakage detection further includes one or more operation monitoring devices that are configured to monitor one or more parts of the metal powder storage box.

The operation monitoring device may be a device for monitoring and collecting data such as a sensor, a camera, etc.

In some embodiments, the processor may determine target location distribution of one or more parts of the metal powder storage box based on monitoring data of a plurality of preset points in the detected pipeline; and control the driving device to drive one or more parts of the metal powder storage box based on the target location distribution, causing that location of the one or more parts of the metal powder storage box meet the target location distribution.

The monitoring data may include data related to a movement of fluid in the detected pipeline and the environment in which the pipeline is located. For example, the monitoring data may include a pipeline pressure, a flow rate of fluid, a pipeline temperature, etc. of the detected pipeline. The monitoring data may be obtained by an internal data acquisition device (such as a sensor).

The target location distribution may be a location on the detected pipeline that has high monitoring necessity. For example, a location with a high leakage risk on the detected pipeline, a location that is convenient for installing the metal powder storage box on the detected pipeline, etc.

In some embodiments, the processor may determine a location corresponding to the monitoring data that obviously deviate from a normal threshold range as the target location distribution of one or more parts of the metal powder storage box. The normal threshold range of the monitoring data may be preset based on experience.

In some embodiments, the processor may control the driving device to drive one or more parts of the metal powder storage box to move (e.g., rotate, translate, etc.) to the target location distribute until one or more parts of the metal powder storage box move to locations consistent with the target location distribution.

In one or more embodiments of the present disclosure, determining the target location distribution based on the monitoring data, and making the location of one or more parts of the metal powder storage box meet the target location distribution makes that the metal powder storage box may monitor data related to the detected pipeline more accurately.

In some embodiments, the processor determines the target location distribution of one or more parts of the metal powder storage box based on the monitoring data of a plurality of preset points in the detected pipeline, including: determining the loss rate of monitoring data between two adjacent preset points based on the monitoring data of the plurality of preset points; predicting the estimated leakage probability of each pipeline section of the detected pipeline based on a plurality of loss rates of a plurality sets of monitoring data between two adjacent preset points; determining a target pipeline section based on the estimated leakage probability of each pipeline section; and determining target location distribution of one or more parts of the metal powder storage box based on the target pipeline section.

In some embodiments, based on the monitoring data of the plurality of preset points, the processor may use ultrasonic technology or other optional methods to obtain monitoring data between preset points and even locate leakage points.

The loss rate may include a pressure loss rate, a flow velocity loss rate, a flow capacity loss rate, etc. of the monitoring data between two adjacent preset points. If leakage occurs, fluid in the pipeline flows from an upstream preset point to a downstream preset point, and values of monitoring data such as a pressure, flow velocity, and flow capacity may decrease. Based on differences between decreased values of the monitoring data, the loss rates of monitoring data between two adjacent preset points may be determined.

In some embodiments, the processor may determine the loss rate of the monitoring data between two adjacent preset points through a mathematical method or a preset rule based on the monitoring data between the preset points. For example, a difference of pressure changes between two adjacent preset points is determined, a ratio of the difference to a pressure of the upstream preset point is calculated, and the ratio is the pressure loss rate of the two adjacent preset points. Loss rate of other types of monitoring data (such as the flow velocity loss rate, the flow capacity loss rate, etc.) of two adjacent preset points may be obtained in a similar manner.

In some embodiments of the present disclosure, determining the loss rate of monitoring data of adjacent preset points facilitates accurately locating leakage locations of the detected pipeline.

In some embodiments, at least based on the plurality of loss rate of the plurality sets of monitoring data between two adjacent preset points (including various types of loss rates corresponding to a plurality sets of various types of monitoring data between two adjacent preset points), the processor may predict the estimated leakage probability of each pipeline section in a gas pipeline through an estimated leakage probability model.

The estimated leakage probability model may be a machine learning model, for example, a convolutional neural network model, a custom model, other models, or any combination thereof.

An input of the estimated leakage probability model includes: a coordinate of a preset point 1, a coordinate of a preset point 2, a plurality of loss rates between the preset point 1 and the preset point 2, and a weight corresponding to each loss rate, environmental factors, and pipeline section features; an output of the estimated leakage probability model includes an estimated leakage probability of a pipeline section between the preset point 1 and the preset point 2. The preset point 1 and the preset point 2 are two adjacent preset points, for example, fluid in the pipeline may flow from the preset point 1 to the preset point 2.

The loss rate of monitoring data between two adjacent preset points is related to differences of coordinate data between preset points. For example, if the differences of coordinate data between preset points are different, pipeline length may be different, and the loss rate may also be different.

Weights of the loss rates of various types of monitoring data between two adjacent preset points are related to categories of each monitoring data between the preset points. For example, the pressure loss rate, the flow velocity loss rate, a temperature loss rate, etc., may have different weights due to different types of corresponding monitoring data.

The weights of the loss rates of various types of monitoring data between two adjacent preset points may be determined by influence degrees of various monitoring data on the flow capacity (e.g., the flow capacity may be determined based on the cross-sectional area of the pipeline and fluid velocity in the pipeline). For example, the flow velocity loss rate is given a high weight while the temperature loss rate is given a low weight (the influence of the temperature on the flow capacity is less than the flow velocity).

The environmental factors include a geographical location of the detected pipeline, which may have a certain influence on the leakage risk and safety requirements of the detected pipeline. For example, the environmental factors may include locating the detected pipeline in an area prone to natural disasters, an area requiring a high safety factor (such as a city center), etc. The environmental factors may be obtained by retrieving stored data, obtaining location data of a location system, obtaining data collected by a sensor, obtaining user-input data, or any other methods.

The pipeline section features include one or more of a pipeline section length, a pipeline diameter, a pipeline wall thickness, a pipeline material, a count of joints in the pipeline section, and a pipeline service life. The pipeline section features may represent a leakage possibility of the detected pipeline. For example, the greater the count of joints in the pipeline section, the longer the pipeline service life, and the more prone the pipeline is to leak. The pipeline section features may be obtained by retrieving stored data, obtaining user-input data, obtaining data collected by a sensor and a monitoring device, or any other methods.

In some embodiments, the estimated leakage probability model may be obtained by training with a plurality of labeled training samples. For example, the plurality of labeled training samples may be input into an initial estimated leakage probability model, a loss function is constructed through labels and results of the initial estimated leakage probability model, and initial parameters are iteratively updated based on the loss function through gradient descent or other methods. When a preset condition is met, a model training is completed, and a trained estimated leakage probability model is obtained. The preset condition may be that the loss function converges, a count of iterations reaches a threshold, etc.

In some embodiments, the training samples may include at least one set of coordinate samples of preset points, a plurality of loss rate samples, weight samples corresponding to each loss rate, environmental factor samples, and pipeline section feature samples. The label may be 0 or 1, which is used to indicate whether there is a leakage.

In some embodiments, the processor determines a pipeline section with an estimated leakage probability greater than a preset threshold as a target pipeline section based on the estimated leakage probability of each pipeline section. The preset threshold may be preset based on experience.

In some embodiments, the processor determines target location distribution for one or more parts of the metal powder storage box based on the target pipeline section. For example, distribution of the target pipeline section may be directly determined as the target location distribution for one or more parts of the metal powder storage box.

In one or more embodiments of the present disclosure, by determining estimated loss probabilities and the target location distribution for one or more parts of the metal powder storage box, leakage on the detected pipeline may be more accurately monitored.

In some embodiments, the processor monitors one or more parts of the metal powder storage box through one or more operation monitoring devices. One operation monitoring device may monitor a plurality of metal powder storage boxes.

The operation monitoring device may monitor the metal powder storage box to obtain relevant data of the device for pipeline leakage detection. The relevant data of the device for pipeline leakage detection includes one or more of operation status, a surrounding environment (such as wind speed, an obstacle, etc.), and an external dimension, etc. of the device for pipeline leakage detection.

In one or more embodiments of the present disclosure, by monitoring the metal powder storage box with the operation monitoring device, the relevant data of the device for pipeline leakage detection may be obtained, thereby monitoring working status of the device for pipeline leakage detection.

In some embodiments, the processor may determine monitoring locations of one or more operation monitoring devices by querying a table constructed based on experience. In some embodiments, a monitoring location of an operation monitoring device may also be referred to as a target monitoring location (or a target monitoring location combination).

In some embodiments, for a part of the metal powder storage box that is not monitored for a long time, the processor may control the operation monitoring device to give priority to monitoring it; however, in order to avoid moving the monitoring device too frequently, it may be determined whether an unmonitored duration and/or a count of part of the metal powder storage box that is not monitored for a long time meet a preset movement condition. When the preset movement condition is met, the operation monitoring device is moved to monitor. The preset movement condition includes that the unmonitored duration is greater than a preset duration threshold, and/or the count of the part of the metal powder storage box that is not monitored for a long time is greater than a preset count threshold.

In some embodiments, the processor determines monitoring locations of one or more operation monitoring devices based on unmonitored durations of each of one or more parts of the metal powder storage box.

An unmonitored duration refers to a time period during which one or more parts of the metal powder storage box are not monitored by the operation monitoring device recently. The unmonitored duration may be obtained by retrieving stored data, obtaining user-input data, or any other methods.

In some embodiments, the processor may generate a plurality sets of candidate monitoring location combinations according to the unmonitored duration, and each set of candidate monitoring location combinations includes one or more candidate locations to which each operation monitoring device goes; the monitoring locations of one or more operation monitoring devices may be further determined by determining evaluation values of each set of candidate monitoring location combinations.

An evaluation value of a candidate monitoring location combination may be used to represent possibility of the candidate monitoring location combination being selected as a target monitoring location combination (the higher the evaluation value, the greater the possibility).

In some embodiments, the evaluation value is related to a total movement length of the operation monitoring device and a sum of the unmonitored duration of each part of the metal powder storage box.

For example, the total movement length of the operation monitoring device is negatively correlated with the evaluation value; and a sum of the unmonitored duration is positively correlated with the evaluation value.

The total movement length of the operation monitoring device and the sum of the unmonitored duration of each part of the metal powder storage box after moving may be obtained by retrieving stored data, obtaining user-input data, obtaining data collected by the sensor and the monitoring device, or any other methods.

In some embodiments, the evaluation value of the candidate monitoring location combination may be determined by weighting and summing evaluation values of each candidate monitoring location. A weight may be set according to an actual situation. The actual situation includes performance situations of each operation monitoring device. The performance situations of each operation monitoring device are positively related to the weight.

In some embodiments, the processor may select the candidate monitoring location combination with the highest evaluation value as the target monitoring location combination.

In one or more embodiments of the present disclosure, by monitoring a location of the metal powder storage box that is not monitored for a long time, and determining the monitoring location combined with the evaluation value of the candidate monitoring location combination, the monitoring location of the operation monitoring device may be determined more comprehensive and efficient, and monitoring and management of the metal powder storage box may be realized better.

In some embodiments, if total lengths of historical movement trajectories of one or more parts of a metal powder storage box are longer, and more pipeline sections with high estimated leakage probability are covered, the processor may control the operation monitoring device to give priority to monitoring the metal powder storage box. Further descriptions regarding the estimated leakage probability may be found in related descriptions hereinabove.

In some embodiments, the processor may determine, based on last monitoring time and historical movement trajectories of each part of one or more parts of the metal powder storage box, monitoring locations of one or more operation monitoring devices.

In some embodiments, the operation monitoring device gives priority to moving to a location that is not monitored for a long time (e.g., longer than a preset time interval threshold) for monitoring. Exemplarily, a metal powder storage box includes five parts (namely A, B, C, D, E), and two operation monitoring devices (namely X1, X2), current operation monitoring devices X1 and X2 are respectively located at A and B, unmonitored durations of A and B are both 0. Assuming that an unmonitored duration of C is 50s, an unmonitored duration of D is 60s, and an unmonitored duration of E is 70s, a preset time interval threshold is 55s, then X1 and X2 may give priority to monitoring D and E.

In some embodiments, when the last monitoring time of one or more parts of the metal powder storage box is greater than the time interval threshold, the processor determines the monitoring location of the monitoring device based on the historical movement trajectories, thereby avoiding being too close to the last monitoring time and monitoring same parts too frequently.

In some embodiments, the processor may determine the monitoring location of the operation monitoring device based on the evaluation value. Further description regarding the evaluation value may be found in the related description hereinabove.

In some embodiments, the evaluation value is also related to a total length of the historical movement trajectories of the metal powder storage box corresponding to the candidate monitoring location combination, and a count of pipeline sections with high estimated leakage probability covered by the historical movement trajectory. The total length of the historical movement trajectories of the metal powder storage box corresponding to the candidate monitoring location combination, and the count of pipeline sections with high estimated leakage probability covered by the historical movement trajectories may be obtained by retrieving stored data, obtaining location data of a location system, and obtaining data collected by a sensor, obtaining user-input data, or any other methods.

The longer the total length of the historical movement trajectories of the metal powder storage box corresponding to the candidate monitoring location combination, the more the count of pipeline sections with high estimated leakage probability covered by the historical movement trajectories, and the higher the evaluation value.

In some embodiments, the processor may determine a plurality of evaluation values through table lookup or other methods according to total lengths of historical movement trajectories of the metal powder storage box corresponding to a plurality of candidate monitoring location combinations, and a count of pipeline sections with high estimated leakage probability covered by the historical movement trajectories.

In some embodiments, the processor may select a candidate monitoring location combination with the highest evaluation value as the monitoring location of the operation monitoring device.

In one or more embodiments of the present disclosure, by considering the last monitoring time and the historical movement trajectories, the monitoring location of the operation monitoring device may be determined more reasonably, thereby improving the pertinence of the operation monitoring device and monitoring the metal powder storage box more orderly.

Inspired by the above-mentioned ideal embodiments according to the present disclosure, through the above-mentioned descriptions, for those skilled in the art, various amendments and variations can be made within the scope of not departing from the technical idea of the present disclosure. The technical scope of the present disclosure is not limited to the content in the present disclosure, but must be determined according to the scope of the claims.

What is claimed is:

1. A device for pipeline leakage detection, wherein the device comprises:
   a metal powder storage box, sleeved on a detected pipeline, wherein the metal powder storage box has a mesh structure, which allows metal powder to be ejected from the metal powder storage box under push of leakage fluid of the detected pipeline;
   at least one rib, wherein the at least one rib is evenly distributed along an outer peripheral wall of the metal powder storage box and fixed on the metal powder storage box, and at least one coil is arranged in a layer in one of the at least one rib; and
   a signal collection and processing device, connected to the at least one coil, wherein the signal collection and processing device is configured to collect and monitor an electromagnetic signal of the at least one coil, and obtain leakage parameters based on an abnormal signal when the abnormal signal occurs.

2. The device for pipeline leakage detection according to claim 1, wherein the at least one coil in one of the at least one rib forms at least one coil plane, and the at least one coil plane is distributed divergently along a radial direction of the metal powder storage box and parallel to an axial direction of the metal powder storage box.

3. The device for pipeline leakage detection according to claim 1, wherein the leakage parameters include at least one of a leakage velocity, a leakage amount per unit time, a leakage hole shape, and a leakage location.

4. The device for pipeline leakage detection according to claim 1, wherein the device for pipeline leakage detection further comprises a driving device and a processor, the driving device is configured to drive the metal powder storage box to move, and the processor is configured to:
   determine, based on monitoring data of a plurality of preset points in the detected pipeline, target location distribution of one or more parts of the metal powder storage box; and
   control, based on the target location distribution, the driving device to drive the one or more parts of the metal powder storage box, so that location of the one or more parts of the metal powder storage box meets the target location distribution.

5. The device for pipeline leakage detection according to claim 1, wherein the device for pipeline leakage detection further comprises one or more operation monitoring devices, and the one or more operation monitoring devices are configured to monitor one or more parts of the metal powder storage box.

6. A method for pipeline leakage detection, wherein the method is executed by a processor, and the method, based on a device for pipeline leakage detection, comprises:
   collecting, by a signal collection and processing device, an electromagnetic signal of at least one coil in a preset state; wherein the preset state includes that a metal powder storage box corresponding to the at least one coil is in a process of moving;
   determining a source of an abnormal signal in response to detecting the abnormal signal,
   determining that a detected pipeline has no leakage in response to the abnormal signal coming from interference, and
   analyzing and processing the abnormal signal to obtain leakage parameters in response to the abnormal signal coming from leakage of the detected pipeline; and
   determining that the detected pipeline has no leakage in response to a failure to detect the abnormal signal.

7. The method for pipeline leakage detection according to claim 6, wherein the determining a source of an abnormal signal includes:
- monitoring the metal powder storage box of a target pipeline section that repeatedly moves and rotates by the signal collection and processing device; wherein the target pipeline section includes a pipeline section where the abnormal signal occurs on the detected pipeline;
- determining that the abnormal signal comes from interference in response to a disappearance of the abnormal signal; and
- determining that the abnormal signal comes from leakage of the detected pipeline in response to repeated occurrence of the abnormal signal.

8. The method for pipeline leakage detection according to claim 6, wherein before the metal powder storage box is sleeved on the detected pipeline, the method further comprises:
- determining size parameters of the device for pipeline leakage detection according to features of the detected pipeline and fluid inside the detected pipeline; and
- determining electromagnetic parameters of the device for pipeline leakage detection based on an accuracy required by the detected pipeline.

9. The method for pipeline leakage detection according to claim 8, wherein
- the size parameters comprise an inner radius of the metal powder storage box, a thickness of the metal powder storage box, a width of a rib, a length of the rib, a thickness of the rib, and an angle between adjacent ribs; and
- the electromagnetic parameters comprise a current, a current frequency, a current direction, turns of coil, radius of coil, metal magnetic permeability, electrical conductivity, a center-to-center distance of adjacent coils in a width direction of the rib, and a center-to-center distance of adjacent coils in a length direction of the rib.

10. The method for pipeline leakage detection according to claim 6, wherein the leakage parameters comprise a leakage velocity, and the method further comprises obtaining the leakage velocity by analyzing and processing the abnormal signal by the processor, comprising:
- obtaining a moment when metal particles pass through the coils according to time-varying current data of a coil with the abnormal signal; wherein the metal particles are particles in metal powder sprayed out from the metal powder storage box and located in a laminar flow zone; and
- obtaining the leakage velocity based on a center-to-center distance of coils where the abnormal signal occurs and the moment.

11. The method for pipeline leakage detection according to claim 10, wherein the leakage parameters further comprise a leakage amount per unit time and a leakage hole shape; and the method further comprises obtaining the leakage amount per unit time and the leakage hole shape by analyzing and processing the abnormal signal by the processor, comprising:
- determining a leakage hole area based on the abnormal signal;
- obtaining the leakage amount per unit time based on the leakage velocity and the leakage hole area;
- determining a gas leakage coefficient based on the leakage amount per unit time; and
- obtaining the leakage hole shape based on the gas leakage coefficient.

12. The method for pipeline leakage detection according to claim 6, wherein the leakage parameters include a leakage location, and the method further comprises obtaining the leakage location by analyzing and processing the abnormal signal by the processor, comprising:
- monitoring the metal powder storage box that reciprocates along an axial direction of the detected pipeline in the detected pipeline leakage section by the signal collection and processing device, and stopping reciprocation when a number of coils where the abnormal signal occurs meets a preset condition; and
- when a change degree of coils in two adjacent ribs of the metal powder storage box is the same, stopping the rotation, and determining a midpoint of an area between the two adjacent ribs as the leakage location.

13. The method for pipeline leakage detection according to claim 6, wherein the method further comprises:
- determining, based on monitoring data of a plurality of preset points in the detected pipeline, a target location distribution of one or more parts of the metal powder storage box; and
- controlling, based on the target location distribution, a driving device to drive the one or more parts of the metal powder storage box, so that location of the one or more parts of the metal powder storage box meets the target location distribution.

14. The method for pipeline leakage detection according to claim 13, wherein the determining, based on monitoring data of a plurality of preset points in the detected pipeline, the target location distribution of one or more parts of the metal powder storage box comprises:
- determining, based on the monitoring data of the plurality of preset points, a loss rate of the monitoring data between two adjacent preset points;
- predicting, at least based on a plurality of loss rates, an estimated leakage probability for each pipeline section of the detected pipeline;
- determining, based on the estimated leakage probability for each pipeline section, the target pipeline section; and
- determining, based on the target pipeline section, the target location distribution of one or more parts of the metal powder storage box.

15. The method for pipeline leakage detection according to claim 6, wherein the method further comprises:
- monitoring one or more parts of the metal powder storage box by one or more operation monitoring devices.

16. The method for pipeline leakage detection according to claim 15, wherein monitoring locations of the one or more operation monitoring devices are determined based on unmonitored duration of each part of one or more parts of the metal powder storage box.

17. The method for pipeline leakage detection according to claim 15, wherein monitoring locations of the one or more operation monitoring devices are determined based on last monitoring time and historical movement trajectory of each part of one or more parts of the metal powder storage box.

* * * * *